(12) United States Patent
McGall et al.

(10) Patent No.: US 10,213,762 B2
(45) Date of Patent: *Feb. 26, 2019

(54) SILANE MIXTURES

(71) Applicant: Affymetrix, Inc., Santa Clara, CA (US)

(72) Inventors: Glenn H. McGall, Palo Alto, CA (US); Robert G. Kuimelis, Palo Alto, CA (US)

(73) Assignee: AFFYMETRIX, INC., Carlsbad, CA (US)

( * ) Notice: Subject to any disclaimer, the term of this patent is extended or adjusted under 35 U.S.C. 154(b) by 100 days.

This patent is subject to a terminal disclaimer.

(21) Appl. No.: 15/417,847

(22) Filed: Jan. 27, 2017

(65) Prior Publication Data

US 2017/0136435 A1    May 18, 2017

Related U.S. Application Data

(60) Division of application No. 13/315,078, filed on Dec. 8, 2011, now Pat. No. 9,556,360, which is a (Continued)

(51) Int. Cl.
*B01J 20/283* (2006.01)
*B01J 20/285* (2006.01)
(Continued)

(52) U.S. Cl.
CPC .......... *B01J 19/0046* (2013.01); *B82Y 30/00* (2013.01); *C08G 77/16* (2013.01); *C08G 77/26* (2013.01);
(Continued)

(58) Field of Classification Search
CPC .......... B01J 19/0046; B01J 2219/00432; B01J 2219/00434; B01J 2219/00439;
(Continued)

(56) References Cited

U.S. PATENT DOCUMENTS 4,839,553 A    6/1989 Mellor
5,418,136 A    5/1995 Miller et al.
(Continued)

FOREIGN PATENT DOCUMENTS

EP    1540005 A2    6/2005
JP    H10288616 A    10/1998
(Continued)

OTHER PUBLICATIONS

Jiang et al., "Preparation of high efficently hybridization DNA chip on glass support," Journal of Jinan University (Natural Science), 22(3): 65-70 (2001).

*Primary Examiner* — Shafiqul Haq
(74) *Attorney, Agent, or Firm* — Affymetrix, Inc.; Jinhee Chang

(57) ABSTRACT

Silanation compositions containing a mixture of two or more silanation reagents, where at least one silanation reagent includes a functional group capable of supporting polymer synthesis and at least one silanation reagent includes no functional group capable of supporting polymer synthesis are useful in modulating the active site density and hydrolytic stability of a surface. These compositions are particularly useful in silanating a surface prior to preparation of a polymer array and provide for increased hybridization results.

30 Claims, 6 Drawing Sheets

FUNCTIONAL AND NON-FUNCTIONAL SILANES

N-(hydroxyethyl)N-methylamino propyltrimethoxysilane (R1)

Bis(3-(methylamino)propyl)trimethoxysilane (R2)

"Bisb"
N-Hydroxyethyl-N,N-Bis(Trimethoxysilylpropyl)amine

Bis(TriMethoxySilyl)Ethane
"BTMSE"

Related U.S. Application Data continuation of application No. 12/358,472, filed on Jan. 23, 2009, now Pat. No. 8,105,821, which is a continuation of application No. 11/442,680, filed on May 25, 2006, and a continuation-in-part of application No. 12/014,879, filed on Jan. 16, 2008, now Pat. No. 7,790,389, which is a division of application No. 10/177,169, filed on Jun. 20, 2002, now Pat. No. 7,332,273.

(51) Int. Cl.
*B01J 19/00* (2006.01)
*B82Y 30/00* (2011.01)
*C08G 77/16* (2006.01)
*C08G 77/26* (2006.01)
*C09D 183/06* (2006.01)
*C09D 183/08* (2006.01)
*C40B 50/18* (2006.01)

(52) U.S. Cl.
CPC .......... *C09D 183/06* (2013.01); *C09D 183/08* (2013.01); *C40B 50/18* (2013.01); *B01J 2219/00432* (2013.01); *B01J 2219/00434* (2013.01); *B01J 2219/00439* (2013.01); *B01J 2219/00497* (2013.01); *B01J 2219/00576* (2013.01); *B01J 2219/00596* (2013.01); *B01J 2219/00605* (2013.01); *B01J 2219/00612* (2013.01); *B01J 2219/00675* (2013.01); *B01J 2219/00677* (2013.01); *B01J 2219/00711* (2013.01); *B01J 2219/00722* (2013.01); *B01J 2219/00725* (2013.01); *B01J 2219/00729* (2013.01)

(58) Field of Classification Search
CPC .... B01J 2219/00497; B01J 2219/00576; B01J 2219/00596; B01J 2219/00605; B01J 2219/00675; B01J 2219/00677; B01J 2219/00711; B01J 2219/00722; B01J 2219/00725; B01J 2219/00612; B01J 2219/00729; C09D 183/06–183/08; C08G 77/16–77/26; C04B 50/08; C08L 83/00
See application file for complete search history.

(56) References Cited

U.S. PATENT DOCUMENTS

| | | |
|---|---|---|
| 5,550,063 A | 8/1996 | Bogart |
| 5,552,272 A | 9/1996 | Bogart |
| 5,576,220 A | 11/1996 | Hudson et al. |
| 5,629,214 A | 5/1997 | Crosby |
| 5,631,171 A | 5/1997 | Sandstrom et al. |
| 5,639,671 A | 6/1997 | Bogart et al. |
| 5,869,272 A | 2/1999 | Bogart et al. |
| 5,955,377 A | 9/1999 | Maul et al. |
| 5,959,098 A | 9/1999 | Goldberg et al. |
| 6,057,424 A | 5/2000 | Vail, III |
| 6,060,237 A | 5/2000 | Nygren et al. |
| 6,235,471 B1 | 5/2001 | Knapp et al. |
| 6,261,782 B1 | 7/2001 | Lizardi et al. |
| 6,262,216 B1 | 7/2001 | McGall |
| 6,355,429 B1 | 3/2002 | Nygren et al. |
| 6,368,808 B2 | 4/2002 | Sato et al. |
| 6,486,287 B2 | 11/2002 | McGall et al. |
| 6,506,594 B1 | 1/2003 | Barany et al. |
| 6,506,716 B1 | 1/2003 | Delplancke et al. |
| 6,528,264 B1 | 3/2003 | Pal et al. |
| 6,569,382 B1 | 5/2003 | Edman et al. |
| 6,569,598 B2 | 5/2003 | Zebala |
| 6,586,238 B1 | 7/2003 | Matulic-Adamic et al. |
| 6,589,779 B1 | 7/2003 | McDevitt et al. |
| 6,602,702 B1 | 8/2003 | McDevitt et al. |
| 6,605,363 B2 | 8/2003 | Ho et al. |
| 6,610,142 B1 | 8/2003 | Takayama et al. |
| 6,610,645 B2 | 8/2003 | Pancheri et al. |
| 6,649,403 B1 | 11/2003 | McDevitt et al. |
| 6,652,808 B1 | 11/2003 | Heller et al. |
| 6,656,428 B1 | 12/2003 | Clark et al. |
| 6,660,338 B1 | 12/2003 | Hargreaves |
| 6,660,517 B1 | 12/2003 | Wilding et al. |
| 6,680,206 B1 | 1/2004 | McDevitt et al. |
| 6,682,924 B1 | 1/2004 | Sierkstra et al. |
| 6,706,473 B1 | 3/2004 | Edman et al. |
| 6,713,298 B2 | 3/2004 | McDevitt et al. |
| 6,731,831 B2 | 5/2004 | Tu |
| 6,733,894 B2 | 5/2004 | Ho et al. |
| 7,153,682 B2 | 12/2006 | Charych et al. |
| 7,195,872 B2 | 3/2007 | Agrawal et al. |
| 7,264,669 B1 | 9/2007 | Tomasino et al. |
| 7,332,273 B2 | 2/2008 | Trulson et al. |
| 7,790,389 B2 | 9/2010 | Trulson et al. |
| 2007/0154946 A1 | 7/2007 | Rajasekaran et al. |
| 2007/0275411 A1 | 11/2007 | McGall et al. |
| 2011/0003716 A1 | 1/2011 | Trulson et al. |

FOREIGN PATENT DOCUMENTS

| | | |
|---|---|---|
| WO | 1991/004491 A1 | 4/1991 |
| WO | 1999/42813 A1 | 8/1999 |
| WO | 2002/14838 A2 | 2/2002 |
| WO | 2004/001506 A2 | 12/2003 |

FUNCTIONAL AND NON-FUNCTIONAL SILANES

FIG. 2

Formulations for Silanation: R2 + Bisb

| Mole Ratio | EtOH | | DI Water | | Bisb in 65% MeOH | Actual Bisb used | | R2 | | | Total Silane conc. |
|---|---|---|---|---|---|---|---|---|---|---|---|
| R2/Bisb | ml | g | ml | g | ml | g | mole | ml | g | mole | Weight% |
| 98 | 940 | 742.6 | 50 | 50 | 0.15 | 0.088 | 0.0002283 | 7.8 | 7.979 | 0.0224 | 1.01 |
| 49 | 940 | 742.6 | 50 | 50 | 0.30 | 0.176 | 0.0004566 | 7.8 | 7.979 | 0.0224 | 1.02 |
| 10 | 940 | 742.6 | 50 | 50 | 1.45 | 0.851 | 0.0022068 | 7.8 | 7.979 | 0.0224 | 1.10 |

FIG. 3

Functional Hydroxyl Density Determination: R2/Bisb

| Mole Ratio (R2/Bisb) | Hydroxyl Density (pmol/cm$^2$) |
|---|---|
| 98 | 16.8 |
| 49 | 10.8 |
| 10 | 10.4 |

FIG. 4

Formulation for Silanation: R2 + R1

| Mole Ratio | EtOH | | DI Water | | R1 in 75% MeOH | Actual R1 used | | R2 | | | Total Silane conc. |
|---|---|---|---|---|---|---|---|---|---|---|---|
| R2/R1 | ml | g | ml | g | ml | g | mole | ml | g | mole | Weight% |
| 98 | 940 | 742.6 | 50 | 50 | 0.087 | 0.056 | 0.000235 | 8 | 8.184 | 0.02302 | 1.03 |
| 50 | 940 | 742.6 | 50 | 50 | 0.17 | 0.109 | 0.000458 | 8 | 8.184 | 0.02302 | 1.04 |
| 10 | 940 | 742.6 | 50 | 50 | 0.85 | 0.544 | 0.002292 | 8 | 8.184 | 0.02302 | 1.09 |

FIG. 5

Functional Hydroxyl Density Determination: R2/R1

| Mole Ratio (R2/R1) | Hydroxyl Density (pmol/cm$^2$) |
|---|---|
| 98 | 7.8 |
| 50 | 8.3 |
| 10 | 13.4 |

High-Efficiency PAG/DMT synthesis

3μm array; 25mer test pattern; hybridization signal 555706-113 Bisb Silane
16hr Hybridization
20nM DNA target/SAPE
[0, 300]
No signal >background (intensity ~85)

555706-91 Bisb Silane
112 hr Hybridization
20nM DNA target/SAPE
[0, 20000 display range]
Good signal (intensity ~16,000)

555659-331 "1:99" low-density Silane
16 hr Hybridization
20nM DNA target/SAPE
[0, 60000 display range]
Good signal (intensity ~40,000)

SILANE MIXTURES

RELATED APPLICATIONS

This application is a division of U.S. patent application Ser. No. 13/315,078, filed Dec. 8, 2011, now U.S. Pat. No. 9,556,360; which is a continuation of U.S. patent application Ser. No. 12/358,472, filed Jan. 23, 2009, now U.S. Pat. No. 8,105,821; which is a continuation of U.S. patent application Ser. No. 11/442,680, filed May 25, 2006, now abandoned, and is a continuation-in-part of U.S. patent application Ser. No. 12/014,879, filed Jan. 16, 2008, now U.S. Pat. No. 7,790,389; which is a division of U.S. patent application Ser. No. 10/177,169, filed Jun. 20, 2002, now U.S. Pat. No. 7,332,273. Each application is hereby incorporated by reference herein in its entirety for all purposes.

BACKGROUND OF THE INVENTION

Silanating reagents have been developed which react with and coat surfaces, such as silica surfaces. Monofunctional silanating reagents have been used to form monolayer surface coatings, while di- and tri-functional silanating reagents have been used to form polymerized coatings on silica surfaces, providing reaction sites for covalent attachment of various materials to the surface. Many silanating reagents, however, produce coatings with undesirable properties including instability to hydrolysis and an inadequate ability to mask the silica surface.

SUMMARY OF THE INVENTION

The present invention provides silanation compositions that include a mixture of two or more silanation reagents, where at least one silanation reagent includes a functional group capable of supporting polymer synthesis and at least one silanation reagent includes no functional group capable of supporting polymer synthesis.

Silanation reagent compositions (mixtures), one reagent having a functional group capable of supporting polymer synthesis and another silanation reagent having no functional group capable of supporting polymer synthesis, allows for control of the density of polymers on a substrate. An overly high density of polymers on a substrate, e.g., an array of oligonucleotides (probes) on a glass chip, where the array is to be used for determining binding of complementary nucleic acids or "targets," has undesirable properties. Target binding is inhibited by an overly dense probe concentration on the surface of the substrate by steric and electrostatic repulsive forces of overly crowded probes on the surface of the substrate. Where the targets are labeled with fluorescent molecules, for example, inhibition of target binding in turn leads to an undesirable decrease in hybridization signal, which in turn could result in false negatives.

It has been discovered in accordance with the present invention that by silanating with a mixture of functional and non-functional silanating reagents a silane coating is created having increased hydrolytic stability. Merely reducing the density of functional silanes without adding non-functional silanes would result in silane coatings with reduced hydrolytic stability.

In one preferred embodiment, the silanation composition has at least one silanation reagent which includes a functional group capable of supporting polymer synthesis is selected from the group consisting of:

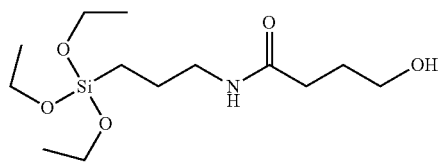

N-(3-(triethoxysilyl)propyl)-4-hydroxybutyramide

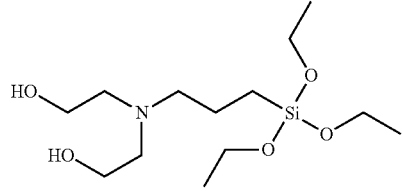

N,N-bis(2-hydroxyethyl)-3-aminopropyltriethoxysilane

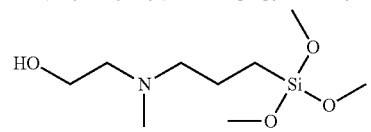

3-((2-hydroxyethyl)methylamino)propyltrimethoxysilane

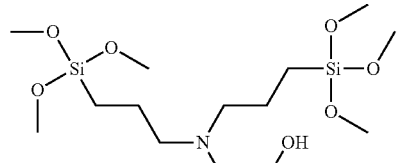

N-(2-hydroxyethyl)-N,N-bis(trimethoxysilylpropyl)amine

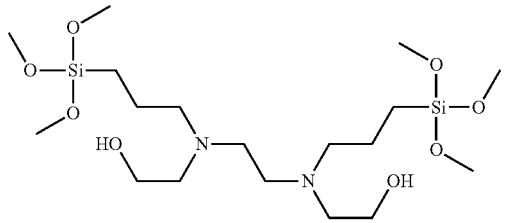

1,2-bis((2-hydroxyethyl)(3-trimethoxysilylpropyl)aminoethane

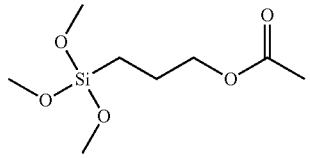

3-acetoxypropyltrimethoxysilane

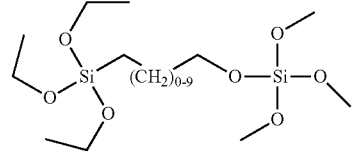

(trimethoxysilyloxy)-($C_3$—$C_{12}$-alkyl)-(triethoxysilane)

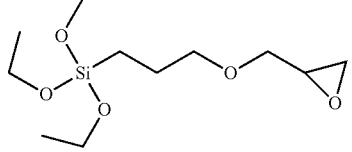

3-glycidoxypropyltriethoxysilane and wherein the at least one silane reagent which does not include a functional group capable of supporting polymer synthesis is selected from the group consisting of alkyl-trimethoxysilane, 1,2-bis(trimethoxysilyl)ethane, 1,3-bis(trimethoxysilyl)propane, 1,6-bis(trimethoxysilyl)hexane, 3-(N,N-dimethylamino)propyltrimethoxysilane and N,N-bis(3-trimethoxysilylpropyl)methylamine.

In one preferred embodiment, the silanation reagent including a functional group capable of supporting polymer synthesis is a masked silanation reagent. Many silanes with masked hydroxyl groups, for example, are highly volatile. Volatile, masked silanes can be readily purified by, e.g., distillation, and can be readily employed in gas-phase deposition methods of silanating substrate surfaces. Gas-phase deposition, as opposed to dipping methods provide for more efficient deposition and uniform coating of the substrate. Prior to attaching monomers the masked silanating reagent must be demasked by procedures discussed, infra.

The present invention provides silanation compositions that include a mixture of two or more silanation reagents, where at least one silanation reagent includes a functional group capable of supporting polymer synthesis and at least one silanation reagent includes no functional group capable of supporting polymer synthesis in predetermined ratios. In a preferred embodiment, the ratios are weight to volume ratios (W:V). In another preferred embodiment, the rations are molar ratios.

The present invention provides methods of silanating a surface that comprises contacting a silica or other silicon oxide-containing surface with a silanation composition that includes a mixture of two or more silanation reagent, where at least one silanation reagent includes a functional group capable of supporting polymer synthesis and at least one silanation reagent includes no functional group capable of supporting polymer synthesis.

In a further aspect, the present invention provides a method of preparing an array of polymers that include the steps of providing a substrate, contacting a silica or other silicon oxide-containing surface of the substrate with a silanation composition that includes a mixture of two or more silanation reagents, where at least one silanation reagent includes a functional group capable of supporting polymer synthesis and at least one silanation reagent includes no functional group capable of supporting polymer synthesis; protecting the functional group capable of supporting polymer synthesis with a protecting group or reacting the functional group capable of supporting polymer synthesis with a compound having a reactive group protected by a protecting group; removing the protecting group in selected regions of the surface to provide an exposed functional or reactive group; reacting said exposed group with a monomer, wherein the monomer is coupled to the exposed group; and repeating the steps of removing and reacting to produce the array of polymers.

The present invention also provides for an array of polymers on a surface of a substrate, where the surface of the substrate is silanated by a silanation composition that includes a mixture of two or more silanation reagents, where at least one silanation reagent includes a functional group capable of supporting polymer synthesis and at least one silanation reagent includes no functional group capable of supporting polymer synthesis.

BRIEF DESCRIPTION OF THE DRAWINGS

FIG. 2 Depicts formulations for Silanation of various mixtures of R2+Bisb.

FIG. 3 Depicts functional hydroxyl density determination for various mixtures of R2 and Bisb.

FIG. 4 depicts formulations for slanation of R1 and R2.

FIG. 5 depicts functional hydroxyl density determinations for various R2/R1 mixtures.

DETAILED DESCRIPTION OF THE INVENTION

Figure 1:
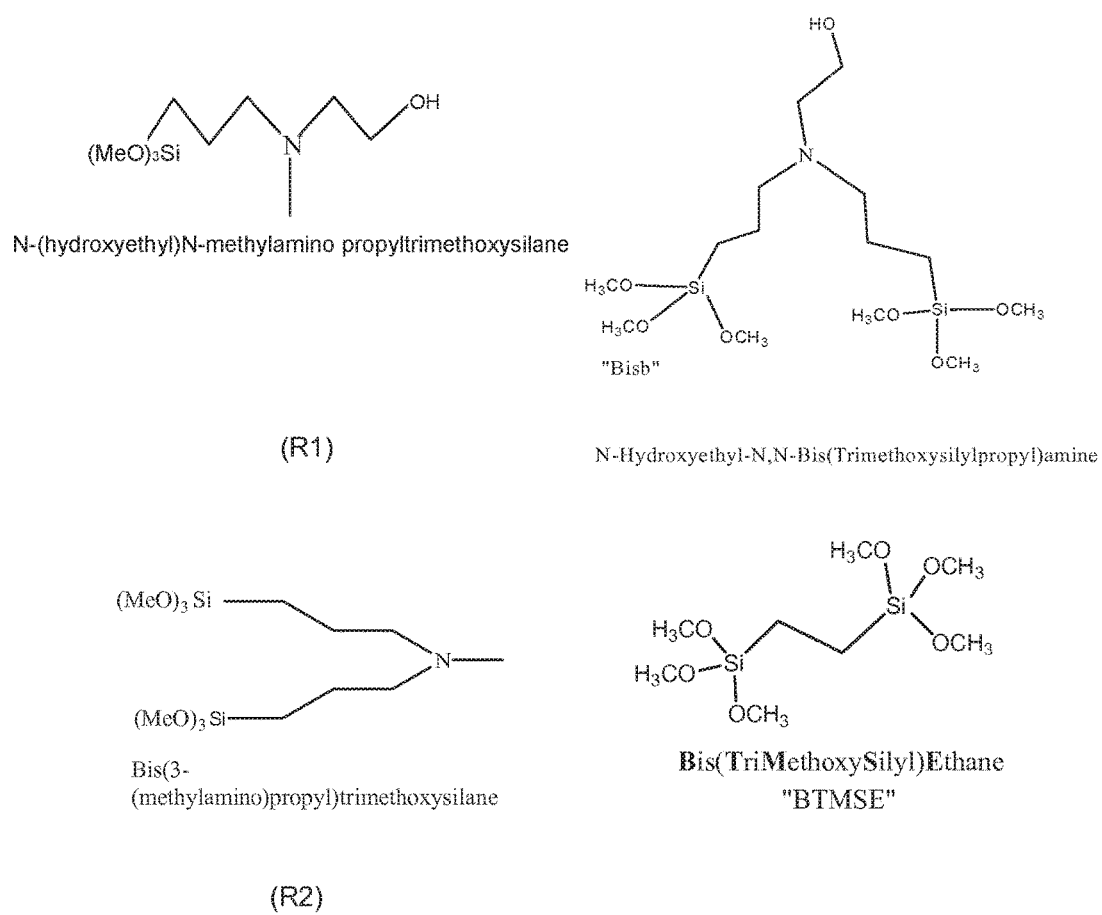
FIG. 1 Depicts two non functional silane compounds (Bis(3-methylamino)propyl)trimethoxysilane (R2) and Bis(trimethoxysilyl)ethane (BTMSE) and two functional silanes (N-(hydroxyethyl)N-methylamino propyltrimethoxysilane (R2) and N-Hydroxyethyl-N,N-Bis(Trimethoxysilylpropyl)amine).

The present invention has many preferred embodiments and relies on many patents, applications and other references for details known to those of the art. Therefore, when a patent, application, or other reference is cited or repeated below, it should be understood that it is incorporated by reference in its entirety for all purposes as well as for the proposition that is recited.

As used in this application, the singular form "a," "an," and "the" include plural references unless the context clearly dictates otherwise. For example, the term "a reagent" includes a plurality of reagents, including mixtures thereof.

An individual is not limited to a human being but may also be other organisms including but not limited to mammals, plants, bacteria, or cells derived from any of the above.

Throughout this disclosure, various aspects of this invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The practice of the present invention may employ, unless otherwise indicated, conventional techniques of organic chemistry, polymer technology, molecular biology (including recombinant nucleic acid techniques), cell biology, biochemistry, and immunology as would be understood by one of the ordinary skill. Such conventional techniques include polymer array synthesis, hybridization, ligation, and detection of hybridization using a label. Specific illustrations of suitable techniques can be had by reference to the examples herein below. However, other equivalent conventional procedures can, of course, also be used. Such conventional techniques and descriptions can be found in standard laboratory manuals such as *Genome Analysis: A Laboratory Manual Series (Vols. I-IV)*, *Using Antibodies: A laboratory Manual*, *Cells: A Laboratory Manual* (all from Cold Spring Harbor Laboratory Press), Stryer, L. (1995) *Biochemistry* (4th Ed.) Freeman, New York, Gait, "*Oligonucleotide Synthesis: A Practical Approach*" 1984, IRL Press, London, Nelson and Cox (2000), Lehninger, *Principles of Biochemistry* $3^{rd}$ Ed., W. H. Freeman. Pub., New York, N.Y. and Berg et al. (2002) *Biochemistry*, 5$^{th}$ Ed., W. H. Freeman Pub., New York, N.Y., all of which are herein incorporated by reference in their entirety.

The present invention can employ solid substrates, including arrays in some preferred embodiments. Methods and techniques applicable to polymer (including protein) array synthesis have been described in U.S. Ser. No. 09/536,841, WO 00/58516, U.S. Pat. Nos. 5,143,854, 5,242,974, 5,252, 743, 5,324,633, 5,384,261, 5,405,783, 5,424,186, 5,451,683, 5,482,867, 5,491,074, 5,527,681, 5,550,215, 5,571,639, 5,578,832, 5,593,839, 5,599,695, 5,624,711, 5,631,734, 5,795,716, 5,831,070, 5,837,832, 5,856,101, 5,858,659, 5,936,324, 5,968,740, 5,974,164, 5,981,185, 5,981,956, 6,025,601, 6,033,860, 6,040,193, 6,090,555, 6,136,269, 6,269,846 and 6,428,752, in PCT Applications Nos. PCT/US99/00730 (International Publication Number WO 99/36760) and PCT/US01/04285 (International Publication Number WO 01/58593), which are all incorporated herein by reference in their entirety.

A "substrate" is a material having a rigid, semi-rigid or gelatinous surface. Typical examples include glass or suitable polymer materials. In some embodiments of the present invention, at least one surface of the substrate will be substantially flat, although in some embodiments it may be desirable to physically separate synthesis regions for different polymers with, for example, wells, raised regions, etched trenches, or the like. In some embodiments, the substrate itself contains wells, trenches, flow through regions, etc. which form all or part of the synthesis regions. According to other embodiments, small beads may be provided on the surface, and compounds synthesized thereon optionally may be released upon completion of the synthesis. Substrates are well known in the art and are readily commercially available through vendors such as USPG, PPG Industries, AFG Industries and others. The substrates used in the invention are preferably those that are readily silanated, such as glass, fused silica and silicon wafers.

Patents that describe synthesis techniques in specific embodiments include U.S. Pat. Nos. 5,412,087, 6,147,205, 6,262,216, 6,310,189, 5,889,165, and 5,959,098, which are all incorporated by reference in their entirety. Nucleic acid arrays are described in many of the above patents, but the same general methodologies are applicable to polypeptide arrays.

The present invention also contemplates many uses for polymers attached to substrates. These uses include gene expression monitoring, profiling, library screening, genotyping and diagnostics. Gene expression monitoring, and profiling methods can be shown in U.S. Pat. Nos. 5,800,992, 6,013,449, 5,020,135, 6,033,860, 6,040,138, 6,177,248 and 6,309,822, which are all incorporated by reference in their entirety. Genotyping and uses therefore are shown in U.S. Ser. Nos. 60/319,253, 10/013,598 (U.S. Patent Application Publication 20030036069), and U.S. Pat. Nos. 5,856,092, 6,300,063, 5,858,659, 6,284,460, 6,361,947, 6,368,799 and 6,333,179, which are incorporated by reference in their entirety. Other uses are embodied in U.S. Pat. Nos. 5,871, 928, 5,902,723, 6,045,996, 5,541,061, and 6,197,506, which are incorporated by reference in their entirety.

The present invention also contemplates sample preparation methods in certain preferred embodiments. Prior to or concurrent with genotyping, the genomic sample may be amplified by a variety of mechanisms, some of which may employ PCR. See, e.g., *PCR Technology: Principles and Applications for DNA Amplification* (Ed. H. A. Erlich, Freeman Press, NY, N.Y., 1992); *PCR Protocols: A Guide to Methods an Applications* (Eds. Innis, et al., Academic Press, San Diego, Calif., 1990); Manila et al., *Nucleic Acids Res.* 19, 4967 (1991); Eckert et al., *PCR Methods an Applications* 1, 17 (1991); *PCR* (Eds. McPherson et al., IRL Press, Oxford); and U.S. Pat. Nos. 4,683,202, 4,683,195, 4,800, 159 4,965,188, and 5,333,675, and each of which is incorporated herein by reference in their entirety. The sample may be amplified on the array. See, for example, U.S. Pat. No. 6,300,070 and U.S. Ser. No. 09/513,300, which are incorporated herein by reference in their entirety.

Other suitable amplification methods include the ligase chain reaction (LCR) (e.g., Wu and Wallace, *Genomics* 4, 560 (1989), Landegren et al., *Science* 241, 1077 (1988) and Barringer et al. *Gene* 89:117 (1990)), transcription amplification (Kwoh et al., *Proc. Natl. Acad. Sci. USA* 86, 1173 (1989) and WO 88/10315), self-sustained sequence replication (Guatelli et al., *Proc. Nat. Acad. Sci. USA*, 87, 1874 (1990) and WO 90/06995), selective amplification of target polynucleotide sequences (U.S. Pat. No. 6,410,276), consensus sequence primed polymerase chain reaction (CP-PCR) (U.S. Pat. No. 4,437,975), arbitrarily primed polymerase chain reaction (AP-PCR) (U.S. Pat. Nos. 5,413,909, 5,861,245) and nucleic acid based sequence amplification (NABSA). (See, U.S. Pat. Nos. 5,409,818, 5,554,517, and 6,063,603, each of which is incorporated herein by reference). Other amplification methods that may be used are described in, U.S. Pat. Nos. 5,242,794, 5,494,810, 4,988,617 and in U.S. Ser. No. 09/854,317. Each of the above references is incorporated herein by reference in its entirety.

Additional methods of sample preparation and techniques for reducing the complexity of a nucleic sample are described in Dong et al., *Genome Research* 11, 1418 (2001), in U.S. Pat. Nos. 6,361,947, 6,391,592 and U.S. Ser. Nos. 09/916,135, 09/920,491 (U.S. Patent Application Publication 20030096235), Ser. No. 09/910,292 (U.S. Patent Application Publication 20030082543), and Ser. No. 10/013,598, each of which is incorporated herein by reference in its entirety.

Numerous methods for conducting polynucleotide hybridization assays have been well developed. Hybridization assay procedures and conditions will vary depending on the application, and are selected in accordance with, the general binding methods known including those referred to in: Maniatis et al. *Molecular Cloning: A Laboratory Manual* (2$^{nd}$ Ed. Cold Spring Harbor, N.Y. 1989); Berger and Kimmel *Methods in Enzymology*, Vol. 152, *Guide to Molecular Cloning Techniques* (Academic Press, Inc., San Diego, Calif., 1987); Young and Davism, *P.N.A.S.*, 80: 1194 (1983). Methods and apparatus for carrying out repeated and controlled hybridization reactions have been described in U.S. Pat. Nos. 5,871,928, 5,874,219, 6,045,996 and 6,386,749, 6,391,623 each of which is hereby incorporated by reference in its entirety.

The present invention contemplates detection of hybridization between a ligand and its corresponding receptor by generation of specific signals. See U.S. Pat. Nos. 5,143,854, 5,578,832; 5,631,734; 5,834,758; 5,936,324; 5,981,956; 6,025,601; 6,141,096; 6,185,030; 6,201,639; 6,218,803; and 6,225,625, in U.S. Ser. No. 60/364,731 and in PCT Application PCT/US99/06097 (published as WO99/47964), each of which also is hereby incorporated by reference in its entirety. Each of these references is incorporated herein by reference in its entirety.

Methods and apparatus for signal detection and processing of intensity data are disclosed in, for example, U.S. Pat. Nos. 5,143,854, 5,547,839, 5,578,832, 5,631,734, 5,800, 992, 5,834,758; 5,856,092, 5,902,723, 5,936,324, 5,981, 956, 6,025,601, 6,090,555, 6,141,096, 6,185,030, 6,201, 639; 6,218,803; and 6,225,625, in U.S. Ser. No. 60/364,731 and in PCT Application PCT/US99/06097 (published as WO 99/47964), each of which also is hereby incorporated by reference in its entirety.

The practice of the present invention may also employ conventional biology methods, software and systems. Computer software products of the invention typically include computer readable medium having computer-executable instructions for performing the logic steps of the method of the invention. Suitable computer readable medium include floppy disk CD-ROM/DVD/DVD-ROM, hard-disk drive, flash memory, ROM/RAM, magnetic tapes and etc. The computer executable instructions may be written in a suitable computer language or combination of several languages. Basic computational biology methods are described in e.g. Setubal and Meidanis et al., *Introduction to Computational Biology Methods* (PWS Publishing Company, Boston, 1997); Salzberg, Searles, Kasif, (Ed.), *Computational Methods in Molecular Biology*, (Elsevier, Amsterdam, 1998); Rashidi and Buehler, *Bioinformatics Basics: Application in Biological Science and Medicine* (CRC Press, London, 2000) and Ouelette and Bzevanis *Bioinformatics: A Practical Guide for Analysis of Gene and Proteins* (Wiley & Sons, Inc., $2^{nd}$ ed., 2001). See U.S. Pat. No. 6,420,108. Each of these references is incorporated herein by reference in its entirety.

The present invention may also make use of various computer program products and software for a variety of purposes, such as probe design, management of data, analysis, and instrument operation. See, U.S. Pat. Nos. 5,593,839, 5,795,716, 5,733,729, 5,974,164, 6,066,454, 6,090,555, 6,185,561, 6,188,783, 6,223,127, 6,229,911 and 6,308,179. Each of these references is incorporated herein by reference in its entirety.

Light patterns can also be generated using Digital Micromirrors, Light Crystal on Silicon (LCOS), light valve arrays, laser beam patterns and other devices suitable for direct-write photolithography. See. e.g., U.S. Pat. Nos. 6,271,957 and 6,480,324, incorporated herein by reference.

Additionally, the present invention may have preferred embodiments that include methods for providing genetic information over networks such as the Internet as shown in U.S. Ser. Nos. 10/063,559 (United States Publication. No. 20020183936), U.S. Provisional Applications 60/349,546, 60/376,003, 60/394,574 and 60/403,381). Each of these references is incorporated herein by reference in its entirety.

The present invention provides methods, devices, and compositions for the formation of arrays of large numbers of different polymer sequences. In one aspect of the present invention, the methods and compositions provided, herein involve the conversion of radiation signals into chemical products that are particularly useful in polymer synthesis. The invention also includes the arrays formed using the methods and compositions disclosed herein. One aspect of the invention includes methods, compositions, and devices for the synthesis of an array of different polymers in selected and predefined regions of a substrate. Another aspect of the invention includes those arrays and various methods of using them.

Such arrays are used in, for example, in nucleic acid analysis. Polynucleotide or nucleic acid arrays are especially suitable for checking the accuracy of previously elucidated sequences and for detecting mutations and polymorphisms. Polymer arrays are also used in screening studies to evaluate their interaction with, for example, receptors such as antibodies in the case of peptide arrays or with nucleic acids in the case, for example of oligonucleotide arrays. For example, certain embodiments of the invention provide for the screening of peptides to determine which if any of a diverse set of peptides has strong binding affinity with a receptor.

In some embodiments of the present invention, the arrays formed by the present invention are used in competitive assays or other well-known techniques to screen for compounds having certain activities. For example, vast collections of synthetic or natural compounds are immobilized on predefined regions of a substrate. The reaction of the immobilized compounds (or compound) with various test compositions such as the members of a chemical library or a biological extract are tested by dispensing small aliquots of each member of the library or extract to a different region. In one embodiment, a large collection of human receptors is deposited on a substrate, one in each region to form an array. A plant or animal extract is then screened for binding to various receptors of the array.

Nucleic acid sequences can also be immobilized in specific locations or predefined regions of a substrate using the current invention. In some embodiments, such immobilized nucleic acid arrays are used in hybridization assays for gene expression monitoring, nucleic, acid amplifications, nucleic acid computation, and nucleic acid analysis in general.

A "predefined region" is a localized area on a substrate which is, was, or is intended to be used for formation of a selected polymer and is otherwise referred to herein in the alternative as "reaction" region, a "selected" region, simply a "region" or a "feature". The predefined region may have any convenient shape, e.g., circular, rectangular, elliptical, wedge-shaped, etc. In accordance with the present invention, the arrays of the present invention have features on the order of 10-100 μm, i.e. 10×10 μm$^2$ to 100×100 μm$^2$ for approximately square features. More preferably the features will be on the order of 1-10 μm. It is also an object of the present invention to provide features having sub-micron dimensions. Such features are preferably on the order of 100-1000 nm. Within these regions, the polymer synthesized therein is preferably synthesized in a substantially pure form. However, in other embodiments of the invention, predefined regions may substantially overlap. In such embodiments, hybridization results may be resolved by software for example.

The density of active sites (i.e., sites available for derivatization) within a feature is preferably at least 5 pmol/cm$^2$, but is more preferably at least 10 pmol/cm$^2$ or even 20 pmol/cm$^2$. Typically, the density of active sites is from 5-20 pmol/cm$^2$.

The present invention has certain features in common with the radiation directed methods discussed in U.S. Pat. No. 5,143,854, incorporated herein by reference. The radiation-directed methods discussed in that patent involve activating predefined regions of the substrate and then contacting the substrate with a preselected monomer solution. The predefined regions can be activated with, for example, a light source shown through a mask (much in the manner of photolithographic techniques used in integrated circuit fabrication). Other regions of the substrate remain inactive because they are blocked by the mask from illumination. Thus, a light pattern defines which regions of the substrate react with a given monomer. By repeatedly activating different sets of predefined regions and providing different monomer compositions thereto, a diverse array of polymers is produced on or near the substrate.

According to another aspect of the present invention, there is no requirement for the use of masks. Predefined regions of the array may be activated by light without the use of photomasks, for example without limitation, by spatial light modulation as discussed in U.S. Pat. No. 6,271,957 and related applications (parent and progeny patents).

An "alkoxy" groups refers to an alkane linked to an oxygen, R—O—, where R is an alkyl group. In accordance with an aspect of the present invention, when an alkoxy group is attached to a silane, it has the structure —Si—O—R, wherein R is an "alkyl" group meaning a straight chain, branched or cyclic chemical group containing only carbon and hydrogen. In accordance with an aspect of the present invention, R includes without limitation —$C_{4-11}H_{9-23}$, without limitation —$(CH_2)_{3-10}CH_3$ and straight branched, cyclic, or any combination thereof. In accordance with an aspect of the present invention, R includes for example methyl, ethyl, propyl, butyl, pentyl, cyclopentyl and 2-methylbutyl. R groups are unsubstituted or substituted with 1 or more substituents (e.g., halogen).

According to one aspect of the present invention, reactive functional groups protected by protecting groups are provided directly or indirectly on the surface of a substrate. In one preferred embodiment of the present invention, the protecting group is a photoremovable (or photolabile) protecting group. In another preferred embodiment, the protecting group is an acid labile protecting group. When a protecting group is indirectly on the surface of a substrate, it is generally part of a linker. A linker is a compound that extends from the substrate surface to another compound (e.g., a polymer). Useful linker molecules are well known to those skilled in the art and representative examples include oligo ethers such as hexaethylene glycol, oligomers of nucleotides, esters, carbonates, amides and the like.

A "protecting group" is a moiety which may be selectively removed to expose an active site such as an amino functionality in peptide or amino acid or a hydroxyl group in a nucleic acid or nucleotide. In accordance with one aspect of the present invention, protecting groups may be removed under a variety of condition. For example, an "acid labile protecting group" is removed by exposure to acid. For an extensive listing of labile protecting groups useful in the practice of the present invention, see also Greene, T. W. and Wuts, P. G. M., Protective Groups in Organic Synthesis, (1991), incorporated herein by reference in its entirety. Useful representative acid sensitive protective groups include dimethoxytrityl (DMT), tertbutylcarbamate (tBoc) and trifluoroacetyl (tFA). Useful representative base sensitive protecting groups include 9-fluorenylmethoxycarbonyl (Fmoc), isobutyrl (iBu), benzoyl (Bz) and phenoxyacetyl (pac). Photolabile protecting groups include methyl-6-nitropiperonyloxycarbonyl (MeNPOC), 6-nitroveratryl (NV), 6-nitroveratryloxycarbonyl (NVOC), 6-nitropiperanyl (NP), 6-nitropiperonyloxycarbonyl (NPOC), methyl-6-nitroveratryl (MeNV), methyl-6-nitroveratryloxycarbonyl (MeNVOC) and methyl-6-nitropiperonyl (MeNP). Other protecting groups include acetamidomethyl, acetyl, tert-amyloxycarbonyl, benzyl, benzyloxycarbonyl, 2-(4-biphenylyl)-2-propyloxycarbonyl, 2-bromobenzyl- oxycarbonyl, tert-butyl, tert-butyloxycarbonyl, 1-carbobenzoxamido-2,2,2-trifluoroethyl, 2,6-dichlorobenzyl, 2-(3,5-dimethoxyphenyl)-2-propyloxycarbonyl, 2,4-dinitrophenyl, dithiasuccinyl, formyl, 4-methoxybenzenesulfonyl, 4-methoxybenzyl, 4-methylbenzyl, o-nitrophenylsulfenyl, 2-phenyl-2-propyloxycarbonyl, α-2,4,5-tetramethylbenzyloxycarbonyl, p-toluenesulfonyl, xanthenyl, benzyl ester, N-hydroxysuccinimide ester, p-nitrobenzyl ester, p-nitrophenyl ester, phenyl ester, p-nitrocarbonate, p-nitrobenzylcarbonate, trimethylsilyl and pentachlorophenyl ester and the like.

For acid labile protecting groups, a photoacid generator ("PAG") is generally provided on the surface, preferably in a film with an acid scavenger. See, e.g., United States Patent Application Serial No. 021700 (20050164258), incorporated herein by reference. This is also called a "resist mixture." The resist mixture can additionally contain a sensitizer.

A "photoacid generator" is a compound or substance which produces acid ($H^+$ or $H_3O^+$) upon exposure to light having a predetermined wavelength.

A "film" as used herein refers to a layer or coating having one or more constituents, applied in a generally uniform manner over the entire surface of a substrate, for example, by spin coating. For example, in accordance with an aspect of the present invention, a film is a solution, suspension, dispersion, emulsion, or other acceptable form of a chosen polymer. For example, a film can include a photoacid generator and optionally a base and a sensitizer, generally in combination with a film-forming polymer. Film-forming polymers are polymers, which after melting or dissolution in a compatible solvent, can form a uniform film on a substrate.

An "acid scavenger" is a compound or substance which acts to neutralize, adsorb and/or buffer acids, e.g., a base or alkaline compound. Acid scavengers act to reduce the amount or concentration of protons or protonated water, i.e., $H^+$ or $H_3O^+$. In the context of the present invention, an acid scavenger acts to neutralize, diminish, or buffer acid produced by a photoacid generator. Preferably, an acid scavenger exhibits little or no stratification within a film over time or following exposure to heat. See U.S. Provisional Patent Application No. 60/755,261, incorporated herein by reference.

A "sensitizer" is a compound which aids in the use of certain photoacid generators ("PAGs"). While the instant invention is not limited by any particular mechanism of action or proposed mechanism of action, the sensitizer is understood to extend the photosensitivity of the PAG, i.e., to shift the photo sensitivity to a longer wavelength of electromagnetic radiation. The sensitizer, also called a photosensitizer, is capable of activating the PAG at, for example, a longer wavelength of light in accordance with an aspect of the present invention. Preferably, the concentration of the sensitizer is greater than that of the PAG, such as 1.1 times to 5 times greater, for example, 1.1 times to 3 times greater the concentration of PAG. Exemplary sensitizers suitable for use in the invention include isopropylthioxanthone (ITX) and 10H-phenoxazine (PhX).

According to an aspect of the present invention, acid is generated in the selected regions from the PAG by exposure of the PAG to light of a predetermined wavelength. The generated acid contacts the protected group(s) for long enough and under appropriate conditions to remove the protecting group. In accordance with an aspect of the present invention, the protecting group is preferably a DMT group and it protects a hydroxyl group. The hydroxyl group can be, for example, part of a substrate, part of a linker, a 5'-hydroxyl group of a nucleotide or deoxynucleotide or a 3'-hydroxyl group of a nucleotide or deoxynucleotide. After sufficient exposure of the protective groups to the acid such that the protective group is removed, but no or substantially no damage is done to any polymer, the surface of the array is stripped, preferably in an appropriate solvent leaving protected and unprotected groups. In one aspect of the invention, the protecting groups are exposed to the acid for up to 3 hours, such as up to 1 hour, and typically from 2-30 or 5-15 minutes. In a preferred embodiment of the present invention, an acid scavenger is employed in conjunction with the PAG to limit damage to the polymer, preferably an oligonucleotide, to diminish damage to the polymer from the acid generated from the PAG.

According to one aspect of the present invention, prior to polymer fabrication, the substrate surface is derivatized using a silane mixture in either water or ethanol. The silane applied to the substrate has a reactive functional group to serve as a site for the addition of polymeric units. Preferably, the silanes also have groups permitting for cross-hybridization of the silanes attached to the substrate, providing additional stability of the silane layer.

In a further preferred embodiment of the present invention, the contacting of the surface of the substrate with a silanation composition is carried out by controlled vapor deposition of the silanation composition on a surface of the substrate. Preferably the substrate is comprised of a glass or silicon substrate. Vapor deposition of the composition involves exposure of the substrate to the reagent in a vacuum oven. In another aspect of the present invention, the silanation compositions of the instant invention may also be used in standard bath deposition or spin coating procedures, as described in greater detail below.

In accordance with an aspect of the present invention, silanes are provided having a protected or "masked" reactive functional group. In preferred embodiments of the present invention, the reactive functional groups are hydroxyl (—OH) where the polymer is a nucleic acid and amino (—NH2) where the polymer is a peptide or protein. Many silanes with masked hydroxyl groups are highly volatile. Volatile, masked silanes can be readily purified by e.g., distillation, can be readily employed in gas-phase deposition methods of silanating substrate surfaces. After coating masked silanes onto the surface of the substrate, the masked reactive functional groups are deprotected to provide an unprotected reactive functional group.

In accordance with an aspect of the present invention, the masked silane must have a structure wherein the substrate-silane bond is not cleaved by the demasking reaction or by subsequent steps employed in polymer synthesis.

After demasking, the hydroxy group of the silane can serve as a site for polymer synthesis on the substrate. Preferably the polymer is peptide or oligonucleotide.

Preferred masked silanes include acetoxyalkylsilanes and epoxyalkylsilanes. A preferred acetoxyalkylsilane is acetoxyalkyltrichlorosilanes. Particularly preferred masked silanes include:

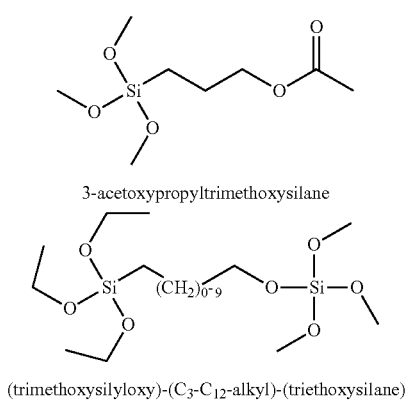

3-acetoxypropyltrimethoxysilane (trimethoxysilyloxy)-(C$_3$-C$_{12}$-alkyl)-(triethoxysilane)

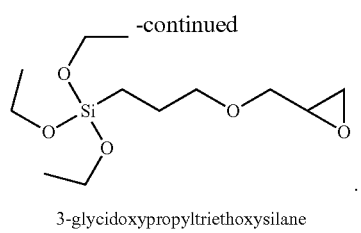

3-glycidoxypropyltriethoxysilane

Masked silanes are deprotected in a variety of ways, depending on the structure of the masking group. Depending on the structure of the masking group, preferred methods of deprotecting include vapor phase ammonia and methylamine or liquid phase aqueous of ethanolic ammonia and alkylamines. In certain cases masked silane reagent may be deprotected by treatment with aqueous acid.

3-acetoxypropyltrimethoxysilane may be deprotected with nucleophiles, for example ethanolamine and ethylenediamine in ethanol or by hydrolysis with dilute aqueous acid (aqueous base hydrolysis would deprotect too, but the silane-substrate bonds are generally too subject to cleavage under basic conditions).

(Trimethoxysilyloxy)-(C$_3$-C$_{12}$-alkyl)-(triethoxysilane) may be deprotected with dilute aqueous acid solutions.

3-glycidoxypropyltriethoxysilane may be deprotected by ring opening to give a 1,2-diol by acid hydrolysis (aqueous acid).

According to one aspect of the present invention, silanation of the substrate comprises dipping or otherwise immersing the substrate in the silanation composition. Following immersion, the substrate is generally spun as described for the substrate stripping process, i.e., laterally, to provide a uniform distribution of the composition across the surface of the substrate. This ensures a more even distribution of reactive functional groups on the surface of the substrate. Following application of the silane layer, the silanated substrate may be baked to cross-polymerize the silanes on the surface of the substrate. Baking typically takes place at temperatures in the range of from 90° C. to 120° C. for a time period of from about 1 minute to about 10 minutes.

In still other preferred embodiments, as noted above, a silanation composition is contacted with the surface of the substrate using controlled vapor deposition methods or spray methods. These methods involve the volatilization or atomization of the silanation composition into a gas phase or spray, followed by deposition of the gas phase or spray upon the surface of the substrate, usually by ambient exposure of the surface of the substrate to the gas phase or spray. Vapor deposition may result in a more even application of the solution than immersing the substrate into the solution.

The efficacy of the silane derivatization process, e.g., the density and uniformity of functional groups on the substrate surface, may generally be assessed by adding a fluorophore which binds the reactive groups, e.g., a fluorescent phosphoramidite such as Fluoreprime™ from Pharmacia, Corp., Fluoredite™ from Millipore, Corp. or FAM™ from ABI, and looking at the relative fluorescence across the surface of the substrate.

The stability of a silanated surface can similarly be assessed using the fluorophores described above. In addition, stability can be assessed by monitoring the hybridization signal from a polymer attached to a silanated surface (the polymer should be selected such that the polymer is stable over the length of the assay).

In accordance with an aspect of the present invention, silanation compositions used in the invention comprise a mixture of two or more silanation reagents, wherein at least one silanation reagent includes a functional group capable of supporting polymer synthesis and at least one silanation reagent with no functional group capable of supporting polymer synthesis.

In one embodiment of the present invention, the silanation compositions comprise a mixture of two or more silanation reagents, wherein at least one silanation reagent includes a functional group capable of supporting polymer synthesis and at least one silanation reagent includes no functional group capable of supporting polymer synthesis wherein the at least one silanation reagent including a functional group is not bis(2-hydroxyethyl)-3-aminopropyltriethoxysilane and the at least one silanation reagent that does not include a functional group is not 1,2-bis(trimethoxysilyl)ethane.

According to another aspect of the present invention, the silanation composition comprises a mixture of two or more silanation reagents, wherein at least one silanation reagent includes a functional group capable of supporting polymer synthesis and at least one silanation reagent which includes no functional group capable of supporting polymer synthesis wherein the silanation reagents are present at predetermined ratios.

According to one aspect of the present invention, it is desired to produce substrates having varying densities of silanes with functional groups. In accordance with an aspect of the present invention arrays having various densities of silanes with a functional group is achieved by treating the substrate with mixtures of silane reagent some having a functional group for polymer synthesis with silanes having no functional group, followed by covalently linking the mixed silanes to the substrate.

It has been discovered in accordance with the present invention, it has been discovered that there is a negative correlation between a very high density of probes (e.g., oligonucleotides attached to the substrate) and efficiency of target hybridization. Target binding is inhibited by and overly dense probe concentration on the surface of the substrate by the steric and electrostatic repulsive effect of overly dense probes on the surface of the substrate. Inhibition of target binding in turn leads to a decrease in hybridization signal, which can result in a perfect match between target and probe being read by scanner technology as a negative result (false negative). It has been discovered in accordance with the present invention that one means to control probe density is through the density of silanes on the substrate with reactive functional groups. In accordance with an aspect of the present invention, the density of silanes with functional groups on the surface of the substrate can be controlled by silanating substrates with silane compositions (mixtures) of silanes with functional groups for polymer synthesis and silanes without a functional group for polymer synthesis.

The issue of overly dense probes on the substrate becomes more acute as methods for in situ fabrication of polymers becomes more efficient. For example, photolithographic fabrication of oligonucleotides using the MeNPOC photo-protecting group has less than a 90% efficiency rate of nucleotide addition in adding additional nucleotides per step in fabricating oligonucleotide DNA strands. Due to the recursive nature of photolithographic synthesis with photo protecting groups, less than 10% of 25 mer oligonucleotides will achieve full length. This inefficiency of probe synthesis mitigates inhibition of target/probe binding caused by high density.

However, with the development of higher efficiency photo protective groups, some approaching 100% efficiency and the development of photoacid generator technology which employs the highly efficient DMT protective group, high density probes and target/probe hybridization inhibition is more problematic. To solve this problem, the present invention limits the density of silanes having reactive functional groups on the substrate by employing silane compositions having silanes with reactive functional groups and silanes having no functional groups to limit the density of functional groups on the surface of the substrate.

In accordance with an aspect of the present invention, the density of silanes with functional groups is controlled by employing silane compositions with a relatively high molar ratio of non-functional group silanes to functional group silanes. In a preferred embodiment of the present invention, the molar ratio of the reagent without a functional group to the reagent with a functional group ranges from about 5 to 1 to 500 to 1, respectively. More preferably, the ratio is from about 5 to 1 to 200 to 1, respectively. Yet another preferred ratio is from about 50 to 1 to 100 to 1, respectively. In a particularly preferred aspect of the present invention, the ratio is 100 to 1, respectively. In another particularly preferred embodiment of the present invention the ratio is 99 to 1.

In a preferred embodiment of the present invention the at least one silanation reagent without a functional group is 1,2-bis(trimethoxysilyl)ethane and the at least one silanation reagent that includes a functional group is bis(2-hydroxyl)-3-aminopropyltriethoxysilane wherein the silanation reagents are present at predetermined ratios. Preferably, the W/V ratio of 1,2-bis(trimethoxysilyl)ethane to bis(2-hydroxyethyl)-3-aminopropyltriethoxysilane group ranges from about 5 to 1 to 500 to 1, respectively. More preferably, the ratio is from about 5 to 1 to 200 to 1, respectively. Yet another preferred ratio is from about 50 to 1 to 100 to 1, respectively. In a particularly preferred aspect of the present invention, the ratio is 100 to 1, respectively.

In accordance with an aspect of the present invention, functional groups capable of supporting polymer synthesis generally include nucleophilic or electrophilic functional groups, particularly those such as amino, hydroxyl and carboxylic acid groups. When the polymer is a nucleic acid (e.g., oligonucleotide), the functional group capable of supporting polymer synthesis is preferably a hydroxyl group. When the polymer is a polypeptide, the functional group capable of supporting polymer synthesis is preferably an amino group. Preferably, a silanation reagent that lacks functional groups capable of supporting polymer synthesis has only alkyl or aryl tertiary amine groups. Preferably, the amines are alkyl tertiary amine groups, aside from the functional groups involved in silanation of the substrate.

In one embodiment, the at least least one silanation reagent which includes a functional group capable of supporting polymer synthesis is selected from the group consisting of:

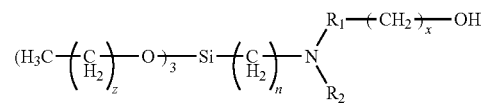

wherein $R_1$ is $CH_2$ or $C(O)$; $R_2$ is H or $(CH_2)_n$—Si—(O—$(CH_2)_z$—$CH_3)_3$; x is 3-7; n is 1 to 5 (e.g., in certain embodiments, n is 1 or 2 when $R_2$ is H); and z is 0-5.

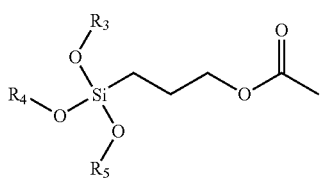

wherein $R_3$, $R_4$, and $R_5$ are independently methyl or ethyl;

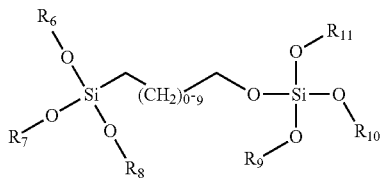

wherein $R_6$, $R_7$, $R_8$, $R_9$, $R_{10}$, and $R_{11}$ are methyl or ethyl; and

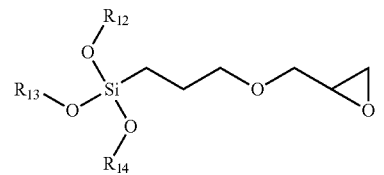

wherein $R_{12}$, $R_{13}$, and $R_{14}$ are independently methyl or ethyl.

In a preferred embodiment, the at least one silane reagent with a functional group is selected from the group consisting of:

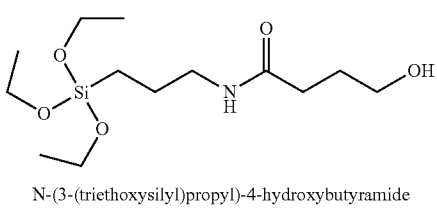

N-(3-(triethoxysilyl)propyl)-4-hydroxybutyramide

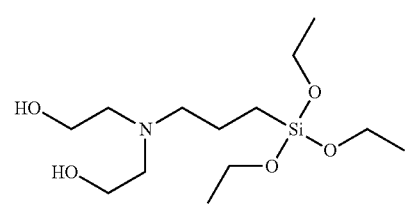

N,N-bis(2-hydroxyethyl)-3-aminopropyltriethoxysilane

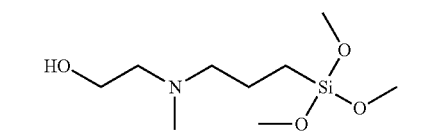

3-((2-hydroxyethyl)methylamino)propyltrimethoxysilane

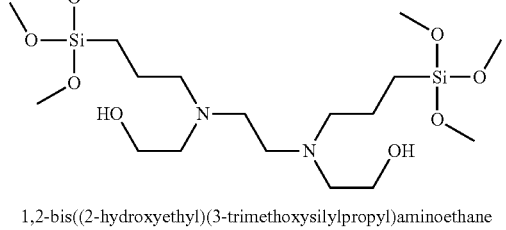

N-(2-hydroxyethyl)-N,N-bis(trimethoxysilylpropyl)amine

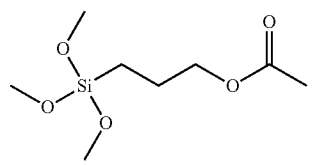

1,2-bis((2-hydroxyethyl)(3-trimethoxysilylpropyl)aminoethane

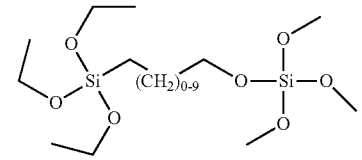

3-acetoxypropyltrimethoxysilane

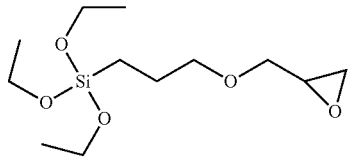

(trimethoxysilyloxy)-(C$_3$—C$_{12}$-alkyl)-(triethoxysilane)

3-glycidoxypropyltriethoxysilane and the at least one silane reagent without a functional group is selected from the group consisting of alkyl-trimethoxysilane, 1,2-bis(trimethoxysilyl)ethane, 1,3-bis(trimethoxysilyl)propane, 1,6-bis(trimethoxysilyl)hexane, 3-(N,N-dimethylamino)propyltrimethoxysilane and N,N-bis(3-trimethoxysilylpropyl)methylamine.

In a preferred embodiment, the silanation composition includes bis-)3-trimethoxysilylpropyl)methylamine and one of N-2-hydroxyethyl-N-methyl-3-aminopropyltrimethoxysilane and N-hydroxyethyl-N,N-bis(trimethoxysilylpropyl)amine. In a preferred embodiment, the silanation composition includes bis(3-trimethoxysilylpropyl)methylamine and one of N-2-hydroxyethyl-N-methyl-3-aminopropyltrimethoxysilane. The structures of these compounds are as shown below:

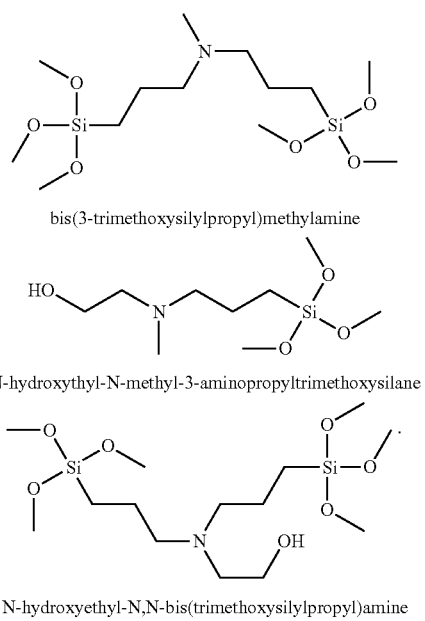

bis(3-trimethoxysilylpropyl)methylamine

N-hydroxythyl-N-methyl-3-aminopropyltrimethoxysilane

N-hydroxyethyl-N,N-bis(trimethoxysilylpropyl)amine

In one embodiment, the silanation reagent are covalently attached to the surface of a solid substrate to provide a coating comprising derivatizable functional groups on the substrate, thus permitting arrays of immobilized polymers (preferably oligomers or peptides, more preferably oligomers) to be covalently attached to the substrate via covalent reaction with the reactive functional groups. The immobilized polymers, such as polypeptides or nucleic acids, can be used in a variety of binding assays including biological binding assays. In another embodiment, high density arrays of immobilized nucleic acid probes may be formed on the substrate, and then one or more target nucleic acids comprising different target sequences may be screened for binding to the high density array of nucleic acid probes comprising a diversity of different potentially complementary probe sequences. For example, methods for light-directed synthesis of DNA arrays on glass substrates is described in McGall et al., J. Am. Chem. Soc., 119:5081-5090 (1997), the disclosure of which is incorporated herein.

Preferably, the array of polymers is an array of nucleic acids. More preferably, the array of nucleic acids is an array of oligonucleotides. The monomers for such arrays are preferably naturally or non-naturally occurring nucleotides. More preferably, the nucleotides employed in the present invention are selected from the group consisting of G, A, T, and C.

According to an aspect of the present invention, a nucleotide is protected at its 5' hydroxyl end by a dimethoxytrityl ("DMT") protective group. In the most preferred embodiments, the nucleotide is selected from the group G, A, T, and C and is protected at its 5' hydroxyl group by a DMT protective group. In another aspect of the present invention, the nucleotide is protected at its 3' hydroxyl group with a DMT protective group. Thus, in accordance with the present invention, nucleotides may be synthesized in the 5' to 3' direction or a 3' to 5' direction.

According to one aspect of the present invention, linker molecules having reactive functioned groups protected by acid labile protecting groups are provided on the surface of a substrate. In one preferred embodiment of the present invention, a photoacid generator ("PAG") is provided on the surface, preferably in a film with an acid scavenger. This is also called a "resist mixture."

In another aspect of the present invention, the resist mixture additionally contains a sensitizer. A set of selected regions on the surface of the substrate is exposed to radiation using well-known lithographic methods discussed, for example, in Thompson, L. F.; Willson, C. G.; and Bowden, M. J., Introduction to Microlithography; *American Chemical Society*, 1994, pp. 212-232, incorporated herein by reference in its entirety.

According to an aspect of the present invention, acid is generated in the selected regions from the PAG by exposure of the PAG to light of a predetermined wavelength. The generated acid contacts the protected group(s) for long enough and under appropriate conditions to remove the protective group. In accordance with an aspect of the present invention, the protective group is preferably a DMT group and it protects a hydroxyl group. The hydroxyl group can be, for example, part of a substrate, part of a linker, a 5' hydroxyl group of a nucleotide or deoxynucleotide or a 3'-hydroxyl group of a nucleotide or deoxynucleotide. After sufficient exposure of the protective groups to the acid such that the protective group is removed, but no or substantially no damage is done to any polymer, the surface of the array is stripped, preferably in an appropriate solvent leaving protected and unprotected groups. In one aspect of the invention, the protective groups are exposed to the acid for up to 3 hours, such as up to 1 hour, and typically from 2-30 or 5-15 minutes. In a preferred embodiment of the present invention, acid exposure is from 1 to 5 minutes.

Monomers having an acid labile protective group are allowed to react with the exposed groups from the acid treatment. The surface is again coated with one of the resist mixtures described above.

In a particular embodiment of the invention, deoxynucleotides having one hydroxyl group with an acid labile protective group and the other with a reactive group, preferably a phosphoramidite group, are allowed to react with the exposed hydroxyl groups from the acid treatment, allowing coupling of the nucleotide to the hydroxyl group. The surface is again coated with one of the resist mixtures described above.

A second set of selected regions is, thereafter, exposed to radiation. The radiation-initiated reactions remove the protecting groups on molecules in the second set of selected regions, i.e. the linker molecules and the first-bound monomers. The s substrate is then contacted with a second monomer containing a removable protective group for reaction with exposed functional groups. This process is repeated to selectively apply monomers until polymers of a desired length and desired chemical sequence are obtained. According to one aspect of the present invention, the monomers are preferably nucleotides. In accordance with an aspect of the present invention, growing chains of nucleic acid are preferably capped in between synthesis rounds. By terminating chain growth where a monomer should have been added but was not, capping limits the production of incorrect nucleotide sequences. Side chain protective groups for exocyclic amines for example are also preferably protected by techniques well known in the art during synthesis and deprotected at the conclusion of synthesis of the nucleotide array.

In one preferred embodiment, the monomer is a 2'-deoxynucleoside phosphoramidite containing an acid labile protecting group at its 5' hydroxyl group. Accordingly, a "monomer" is understood to include both the individual units of a finished polymer (e.g., oligonucleotide, polypeptide) and compounds that become individual units of a finished polymer upon attaching to a substrate and optionally further reaction (e.g., to remove protecting groups, to oxidize phosphite esters to phosphate esters). As stated previously, in an alternate embodiment, the protecting group is present at the 3' hydroxyl group if synthesis of the polynucleotide is from the 5' to 3' direction. The nucleoside phosphoramidite is represented in accordance with one aspect of the present invention by the following formula:

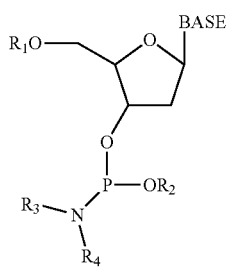

wherein the base is adenine, guanine, thymine, or cytosine, $R_1$ is a protecting group which makes the 5' hydroxyl group unavailable for reaction and includes dimethoxytrityl, tert-butyloxycarbonyl or any of the protecting groups known to those of skill in the art; $R_2$ is cyanoethyl, methyl, t-butyl, trimethylsilyl or the like; and $R_3$ and $R_4$ are isopropyl, cyclohexyl and the like. Exocyclic amines present on the bases can also be protected with acyl protecting groups such as benzoyl, isobutyryl, phenoxyacetyl and the like. The linker molecule contains an acid- or base-removable protecting group. Useful linker molecules are well known to those skilled in the art and representative examples include oligo ethers such as hexaethylene glycol, oligomers of nucleotides, ester, carbonates, amides and the like. Useful protecting groups include those previously listed and others known to those skilled in the art.

In still another preferred embodiment of the present invention, the array of polymers is an array of peptides, where the monomers are amino acids. Suitable amino acids include naturally occurring amino acid and non-naturally occurring amino acids. Preferably, the amino acid is selected from the group consisting of the L form alanine, arginine, asparagine, aspartic acid, cysteine, glutamine, glutamic acid, glycine, histidine, isoleucine, leucine, lysine, methionine, phenylalanine, praline, serine, threonin, tryptophan, tyrosine and valine. Preferably, an amino acid is protected at its amino terminus functionality by a tert-butyloxycarbonyl ("tBOC") protective group during synthesis.

According to another aspect of the present invention, suitable amino acids include peptide nucleic acids (PNAs). PNAs include a peptide backbone with nitrogenous bases attached to this backbone, such that they can serve as mimics of nucleic acids (including oligomers). Preferably, PNAs have a greater affinity for a complementary nucleic acid sequence than the analogous native nucleic acid. Suitable PNA repeat units are shown by the following structural formulae:

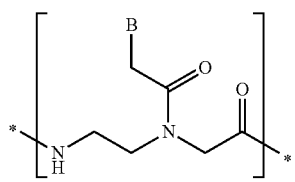

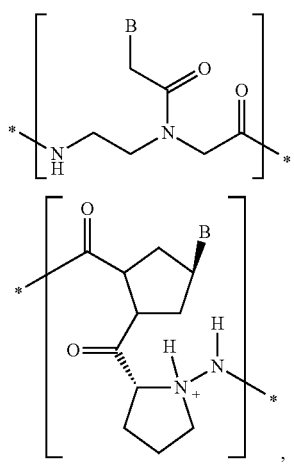

where B represents a base, typically adenine, cytosine, guanine or thymine. Other backbones are suitable, provided that the resulting PNAs are capable or hybridizing with nucleic acids.

Syntheses of PNAs are described in Hyrup and Nielsen, *Bioorg. Med. Chem.* (1996) 4:5-23; and Vilaivan and Lowe, *J. Am. Chem. Soc.* (2002) 124:9326-9327, the contents of which are incorporated herein by reference.

In an aspect of invention, density of PNAs in an array and any linker groups are selected such that a 2:1 complex of PNA to a hybridized DNA or RNA sample can be formed. In another aspect of the invention, a chimeric polymer of PNA and a nucleic acid is prepared.

In accordance with an aspect of the present invention, a silanation composition is provided comprising a mixture of two or more silanation reagents, wherein at least one silanation reagent includes a functional group capable of supporting polymer synthesis and at least one silanation reagent which includes no functional group capable of supporting polymer synthesis.

In preferred embodiment the silanation composition comprises the at least one silanation reagent which includes a functional group capable of supporting polymer synthesis is selected from the group consisting of:

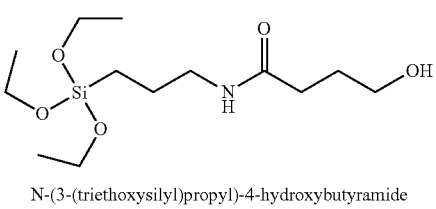

N-(3-(triethoxysilyl)propyl)-4-hydroxybutyramide

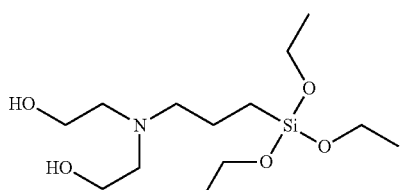

N,N-bis(2-hydroxyethyl)-3-aminopropyltriethoxysilane

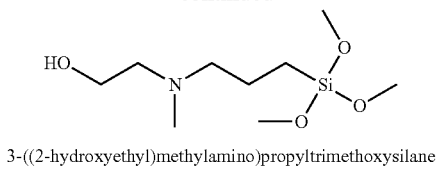

3-((2-hydroxyethyl)methylamino)propyltrimethoxysilane

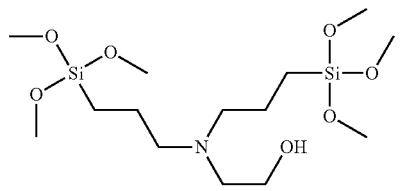

N-(2-hydroxyethyl)-N,N-bis(trimethoxysilylpropyl)amine

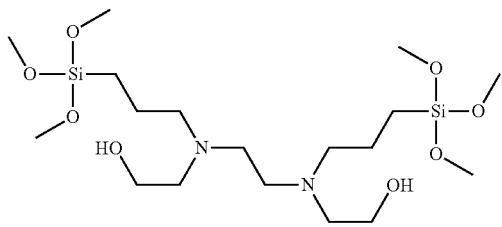

1,2-bis((2-hydroxyethyl)(3-trimethoxysilylpropyl)aminoethane

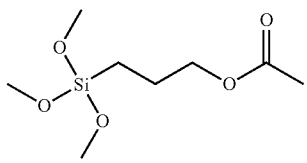

3-acetoxypropyltrimethoxysilane

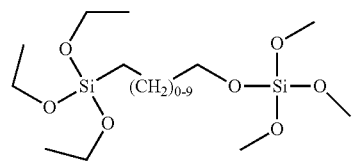

(trimethoxysilyloxy)-($C_3$—$C_{12}$-alkyl)-(triethoxysilane)

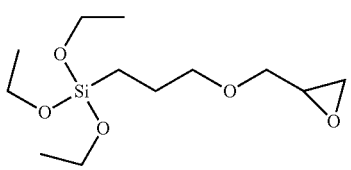

3-glycidoxypropyltriethoxysilane and the at least one silane reagent which does not include a functional group capable of supporting polymer synthesis is selected from the group consisting of alkyl-trimethoxysilane, 1,2-bis(trimethoxysilyl)ethane, 1,3-bis(trimethoxysilyl)propane, 1,6-bis(trimethoxysilyl)hexane, 3-(N,N-dimethylamino)propyltrimethoxysilane and N,N-bis(3-trimethoxysilylpropyl)methylamine.

In a preferred embodiment, the at least one silanation reagent including a functional group capable of supporting polymer synthesis is a masked silanation reagent. Preferably, the masked silanation reagent is selected from the group consisting of:

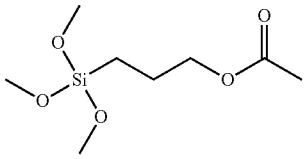

3-acetoxypropyltrimethoxysilane

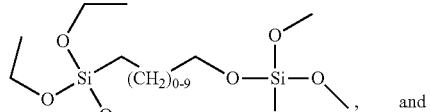

(trimethoxysilyloxy)-($C_3$—$C_{12}$-alkyl)-(triethoxysilane)

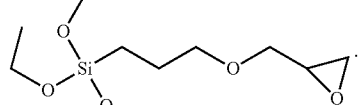

3-glycidoxypropyltriethoxysilane

In a particularly preferred embodiment the at least one silanation reagent which includes a functional group capable of supporting polymer synthesis is N,N-bis(2-hydroxyethyl)-3-aminopropyltriethoxysilane and the at least one silanation reagent which includes no functional group capable of supporting polymer synthesis is 1,2-bis(trimethoxysilyl)ethane.

In a preferred embodiment, the at least one silanation reagent which includes a functional group capable of supporting polymer synthesis is N-(2-hydroxyethyl)-N,N-bis(trimethoxysilylpropyl)amine and the at least one silanation reagent which includes no functional group capable of supporting polymer synthesis is 1,2-bis(trimethoxysilyl)ethane.

In a preferred embodiment the at least one silanation reagent which includes no functional group capable of supporting polymer synthesis and the at least one silanation reagent which includes a functional group capable of supporting polymer synthesis are present at predetermined ratios. Preferably, the predetermined ratios are weight to volume ratios (W:V). In another preferred embodiment, the ratios are molar ratios.

In a preferred embodiment, the W/V ratio of the at least one silanation reagent which includes no functional group capable of supporting polymer synthesis and the at least one silanation reagent which includes a functional group capable of supporting polymer synthesis are present at ranges from about 5 to 1 to 500 to 1, respectively.

More preferably, the W/V ratio at the at least one silanation reagent which includes no functional group capable of supporting polymer synthesis and the at least one silanation reagent which includes a functional group capable of supporting polymer synthesis are present at ranges from about ranges from about 5 to 1 to 200 to 1, respectively.

In another preferred embodiment, the W/V ratio of the at least one silanation reagent which includes no functional group capable of supporting polymer synthesis and the at least one silanation reagent which includes a functional group capable of supporting polymer synthesis are present at ranges from about 50 to 1 to 100 to 1, respectively.

More preferably, the W/V ratio of the at least one silanation reagent which includes no functional group capable of supporting polymer synthesis and the at least one silanation reagent which includes a functional group capable of supporting polymer synthesis is about 100 to 1 or 99 to 1 respectively.

In a preferred embodiment, the at least one silanation reagent which includes no functional group capable of supporting polymer synthesis is 1,2-bis(trimethoxysilyl)ethane and the at least one silanation reagent which includes a functional group capable of supporting polymer synthesis is bis(2-hydroxyethyl)-3-aminopropyltriethoxysilane.

Preferably, ratio of 1,2-bis(trimethoxysilyl)ethane to bis(2-hydroxyethyl)-3-aminopropyltriethoxysilane ranges from about 5 to 1 to 500 to 1, respectively.

More preferably, the W/V ratio of 1,2-bis(trimethoxysilyl)ethane to bis(2-hydroxyethyl)-3-aminopropyltriethoxysilane ranges from about 5 to 1 to 200 to 1, respectively.

Still more preferably, the W/V ratio of 1,2-bis(trimethoxysilyl)ethane to bis(2-hydroxyethyl)-3-aminopropyltriethoxysilane ranges from about 50 to 1 to 100 to 1, respectively. Most preferably, the W/V ratio of 1,2-bis(trimethoxysilyl)ethane to bis(2-hydroxyethyl)-3-aminopropyltriethoxysilane ratio is about 100 to 1 and 99 to 1, respectively.

In another preferred embodiment, the at least one silanation reagent which includes no functional group capable of supporting polymer synthesis is bis(3-trimethoxysilylpropyl (methylamine and the at least one silanation reagent which includes a functional group capable of supporting polymer synthesis is selected from the group consisting of N-2-hydroxyethyl-N-methyl-3-aminopropyltrimethoxysilane and N-2-hydroxyethyl-N,N-bis(trimethoxysilylpropyl) amine.

In another preferred embodiment, the at least one silanation reagent which includes no functional group capable of supporting polymer synthesis is bis(3-trimethoxysilylpropyl)methylamine and the at least one silanation reagent which includes a functional group capable of supporting polymer synthesis is selected from the group consisting of N-2-hydroxyethyl-N-methyl-3-aminopropyltrimethoxysilane and N-2-hydroxyethyl-N,N-bis(trimethoxysilylpropyl) amine and the W:V ratio ranges from about 5 to 1 to 500 to 1, respectively.

More preferably, the W:V ratio of bis(3-trimethoxysilylpropyl)methylamine to N-2-hydroxyethyl-N-methyl-3-aminopropyltrimethoxysilane or N-2-hydroxyethyl-N,N-bis(trimethoxysilylpropyl)amine ranges from about 5 to 1 to 200 to 1, respectively.

Still more preferably, the W:V ratio of bis(3-trimethoxysilylpropyl)methylamine to N-2-hydroxyethyl-N-methyl-3-aminopropyltrimethoxysilane or N-2-hydroxyethyl-N,N-bis(trimethoxysilylpropyl)amine ranges from about 50 to 1 to 100 to 1, respectively.

Most preferably, the W:V ratio of bis(3-trimethoxysilylpropyl)methylamine to N-2-hydroxyethyl-N-methyl-3-aminopropyltrimethoxysilane or N-2-hydroxyethyl-N,N-bis(trimethoxysilylpropyl)amine is about 100 to 1 and 99 to 1, respectively.

In another referred embodiment, the composition does not compose a mixture of bis(2-hydroxyethyl)-3-aminopropyltriethoxysilane and 1,2-bis(trimethoxysilyl)ethane. In another preferred embodiment the composition (e.g., of claim 1) does not contain 1,2-bis(trimethoxysilyl)ethane.

In accordance with an aspect of the present invention, a method of silanating a surface is presented wherein a silica or other silicon oxide-containing surface with a silanation composition that includes a mixture of two or more silanation reagents, where at least one silanation reagent which includes no functional group capable of supporting polymer synthesis and at least one silanation reagent includes a functional group capable of supporting polymer synthesis.

A preferred embodiment of the method or silanating a surface, wherein the at least one silanation reagent which includes a functional group capable of supporting polymer synthesis is selected from the group consisting of:

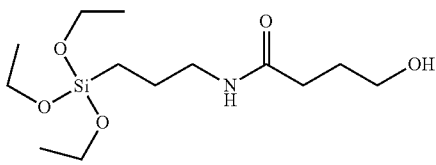

N-(3-(triethoxysilyl)propyl)-4-hydroxybutyramide

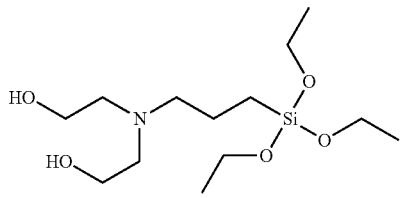

N,N-bis(2-hydroxyethyl)-3-aminopropyltriethoxysilane

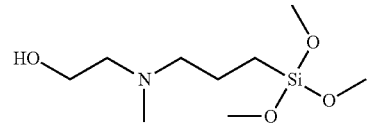

3-((2-hydroxyethyl)methylamino)propyltrimethoxysilane

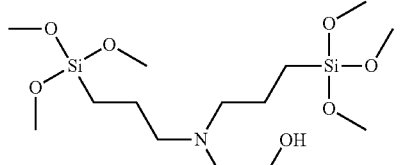

N-(2-hydroxyethyl)-N,N-bis(trimethoxysilylpropyl)amine

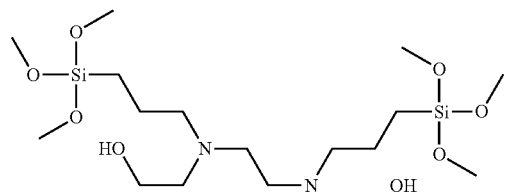

1,2-bis((2-hydroxyethyl)(3-trimethoxysilylpropyl)aminoethane

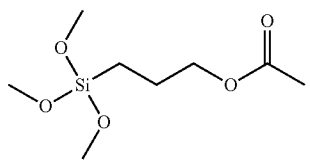

3-acetoxypropyltrimethoxysilane

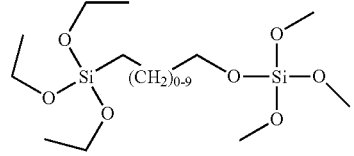

(trimethoxysilyloxy)-($C_3$—$C_{12}$-alkyl)-triethoxysilane

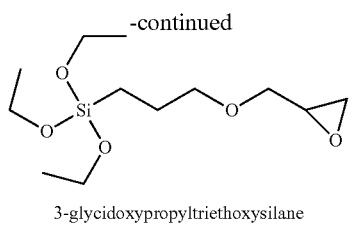

3-glycidoxypropyltriethoxysilane and wherein the at least one silanation reagent which includes no functional group capable of supporting polymer synthesis is selected from the group consisting of alkyltrimethoxysilane, 1,2-bis(trimethoxysilyl)ethane, 1,3-bis(trimethoxysilyl)propane, 1,6-bis(trimethoxysilyl)hexane, 3-(N,N-dimethylamino)propyltrimethoxysilane and N,N-bis(3-trimethoxysilylpropyl)methylamine.

In a preferred embodiment of the invention, the at least one silanation reagent which includes a functional group capable of supporting polymer synthesis is N-2-hydroxyethyl)-N,N-bis(trimethoxysilylpropyl)amine and the at least one silanation reagent which includes no functional group capable of supporting polymer synthesis is 1,2-bis(trimethoxysilyl)ethane.

In a preferred embodiment, the method of silanating a surface employs as the at least one silanation reagent which includes a functional group capable of supporting polymer synthesis comprises a masked silanation reagent.

Preferably, the masked silanation reagent is selected from the group consisting of:

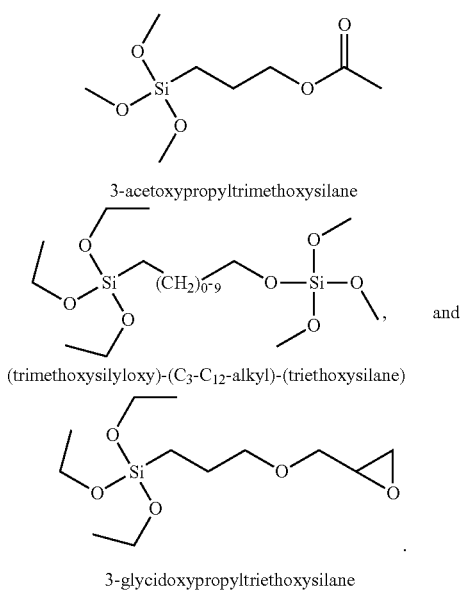

In another preferred embodiment, the method of silanating a surface is by vapor deposition of the masked silanating reagent.

Preferably, the method of silanating a surface with a masked silanating reagent further comprises the step of deprotecting the masked silanating reagent to provide a deprotected functional group capable of supporting polymer synthesis.

In a preferred embodiment of the method of silanating a surface the at least one silanation reagent which includes no functional group capable of supporting polymer synthesis is bis(3-trimethoxysilylpropyl)methylamine and the at least one silanation reagent which includes a functional group capable of supporting polymer synthesis is selected from the group consisting of N-2-hydroxyethyl-N-methyl-3-aminopropyltrimethoxysilane and N-hydroxyethyl-N,N-bis(trimethoxysilylpropyl)amine.

In another preferred embodiment, in the method of silanating a surface the silanating composition does not comprise a mixture of bis(2-hydroxyethyl)-3-aminopropyltriethoxysilane and 1,2-bis(trimethoxysilyl)ethane. In another preferred embodiment, the composition does not contain 1,2-bis(trimethoxysilyl)ethane.

In accordance with another aspect of the present invention, a method is presented of preparing an array of polymers comprising: providing a substrate; contacting a silica or other silicon oxide-containing surface of the substrate with a silanation composition that comprises a mixture of two or more silanation reagents, where at least one silanation reagent includes a functional group capable of supporting polymer synthesis and at least one silanation reagent includes no functional group capable of supporting polymer synthesis; protecting the functional group capable of supporting polymer synthesis with a protecting group or reacting the functional group capable of supporting polymer synthesis with a compound having a reactive group protected by a protecting group; removing the protecting group in selected regions of the surface to provide an exposed functional or reactive group; reacting the exposed group with a monomer, wherein the monomer is coupled to the exposed group; and repeating the steps of removing and reacting to produce the array of polymers.

Preferably, the array of polymers is an array of nucleic acids. It is also preferred that the array of polymers is a polypeptide array.

In a preferred embodiment of the method of preparing an array of polymers, the silanation composition comprises bis(3-trimethoxysilylpropyl)methylamine and one of N-2-hydroxyethyl-N-methyl-3-aminopropyltrimethoxysilane and N-2-hydroxyethyl-N,N-bis(trimethoxysilylpropyl)amine.

In another preferred embodiment of the method of preparing an array of polymers, the silanation composition comprises bis(3-trimethoxysilylpropyl)methylamine and N-2-hydroxyethyl-N-methyl-3-aminopropyltrimethoxysilane.

In another preferred embodiment of the method of preparing an array of polymers, the silanation composition comprises bis(3-trimethoxysilylpropyl)methylamine and N-2-hydroxyethyl-N,N-bis(trimethoxysilylpropyl)amine.

In a preferred embodiment of the method of preparing an array of polymers, the protecting group is a photoremovable protecting group.

In still another preferred embodiment of the method of preparing an array of polymers, the protecting group is an acid labile protecting group.

In still another preferred embodiment of the method of preparing an array of polymers, the step of removing comprises activating a photoacid generator in the selected regions by selective application of light having a predetermined wavelength to provide an acid and exposing the protecting group to the acid.

In still another preferred embodiment of the method of preparing an array of polymers, the at least one silanation reagent which includes a functional group capable of supporting polymer synthesis is selected from the group consisting of:

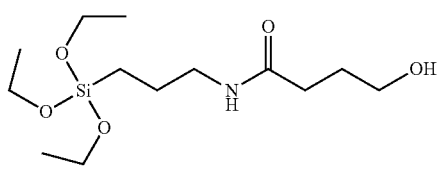

N-(3-(triethoxysilyl)propyl)-4-hydroxybutyramide

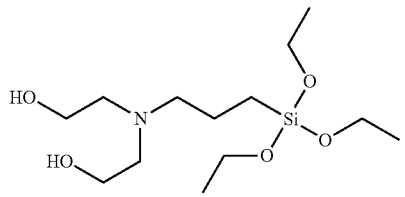

N,N-bis(2-hydroxyethyl)-3-aminopropyltriethoxysilane

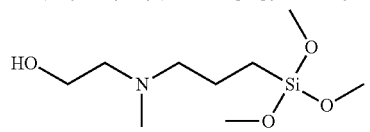

3-((2-hydroxyethyl)methylamino)propyltrimethoxysilane

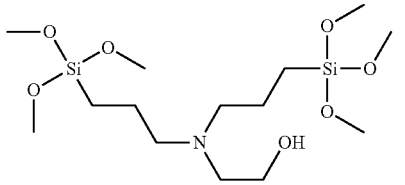

N-(2-hydroxyethyl)-N,N-bis(trimethoxysilylpropyl) amine

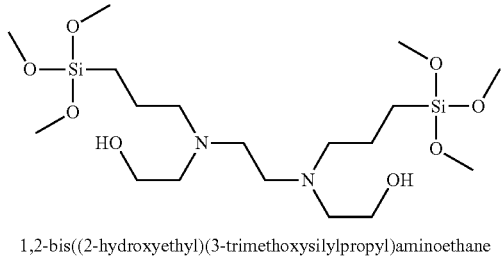

1,2-bis((2-hydroxyethyl)(3-trimethoxysilylpropyl)aminoethane

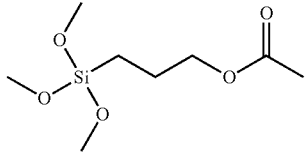

3-acetoxypropyltrimethoxysilane

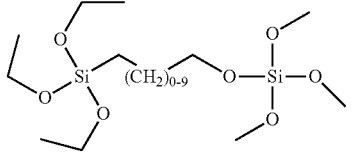

(trimethoxysilyloxy)-(C$_3$—C$_{12}$-alkyl)-triethoxysilane

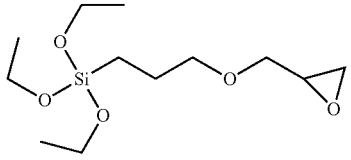

3-glycidoxypropyltriethoxysilane and wherein the at least one silane reagent which does not include a functional group capable of supporting polymer synthesis is selected from the group consisting of alkyltrimethoxysilane, 1,2-bis(trimethoxysilyl)ethane, 1,3-bis(trimethoxysilyl)propane, 1,6-bis(trimethoxysilyl)hexane, 3-(N,N-dimethylamino)propyltrimethoxysilane and N,N-bis(3-trimethoxysilylpropyl)methylamine.

In still another preferred embodiment of the method of preparing an array of polymers, the at least one silanation reagent which includes a functional group capable of supporting polymer synthesis comprises a masked silanation reagent.

Preferred masked silanation reagents include:

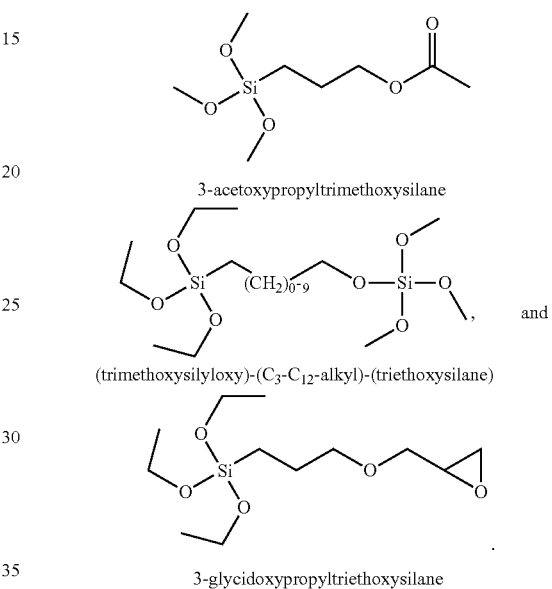

Preferably, masked silanating reagents are applied by vapor deposition of the masked silanating reagent. The masked silanating reagents are preferably deprotected to provide a deprotected functional group capable of supporting polymer synthesis.

In still another preferred embodiment of the method of preparing an array of polymers, the silanation composition comprises a mixture of two or more silanation reagents, wherein the at least one silanation reagent which includes a functional group capable of supporting polymer synthesis is N,N-bis(2-hydroxyethyl)-3-aminopropyltriethoxysilane and the at least one silanation reagent which includes no functional group capable of supporting polymer synthesis is 1,2-bis(trimethoxysilyl)ethane.

In still another preferred embodiment of the method of preparing an area of polymers, the at least one silanation reagent which includes a functional group capable of supporting polymer synthesis is N-(2-hydroxyethyl)-N,N-bis(trimethoxysilylpropyl)amine and the at least one silanation reagent which includes no functional group capable of supporting polymer synthesis is 1,2-bis(trimethoxysilyl)ethane.

In still another preferred embodiment of the method of preparing an array of polymers, the at least one silanation reagent which includes no functional group capable of supporting polymer synthesis and at the least one silanation reagent which includes a functional group capable of supporting polymer synthesis synthesis are present at predetermined ratios.

Preferably, the predetermined ratios are molar ratios.

In still another preferred embodiment of the method of preparing an array of polymers, the W/V ratio of the at least one silanation reagent which includes no functional group capable of supporting polymer synthesis and the at least one silanation reagent which includes a functional group capable of supporting polymer synthesis are present at ranges from about 5 to 1 to 500 to 1, respectively.

More preferably, the W/V ratio ranges from about 5 to 1 to 200 to 1, respectively. Still more preferably, the ratio ranges from about 50 to 1 to 100 to 1, respectively. Most preferably, the ratio is about 100 to 1 and 99 to 1, respectively.

In still another preferred embodiment of the method of preparing an array of polymers, the at least one silanation reagent which includes no functional group capable of supporting polymer synthesis is 1,2-bis(trimethoxysilyl)ethane and the at least one silanation reagent which includes a functional group capable of supporting polymer synthesis is bis(2-hydroxyethyl)-3-aminopropyltriethoxysilane.

In still another preferred embodiment of the method of preparing an array of polymers, the W/V ratio of 1,2-bis(trimethoxysilyl)ethane to bis(2-hydroxyethyl)-3-aminopropyltriethoxysilane ranges from about 5 to 1 to 500 to 1, respectively. More preferably, the W/V ratio of 1,2-bis(trimethoxysilyl)ethane to bis(2-hydroxyethyl)-3-aminopropyltriethoxysilane ranges from about 5 to 1 to 200 to 1, respectively. Still more preferably, the W/V ratio of 1,2-bis(trimethoxysilyl)ethane to bis(2-hydroxyethyl)-3-aminopropyltriethoxysilane ranges from about 50 to 1 to 1 to 100 to 1, respectively. Most preferably, the W/V ratio of 1,2-bis(trimethoxysilyl)ethane to bis(2-hydroxyethyl)-3-aminopropyltriethoxysilane ratio is about 100 to 1, respectively.

In an other preferred embodiment of the method of preparing an array of polymers, the silanating composition does not comprise a mixture of bis(2-hydroxyethyl)-3-aminopropyltriethoxysilane and 1,2-bis(trimethoxysilyl)ethane. In another preferred embodiment, the composition does not contain 1,2-bis(trimethoxysilyl)ethane.

According to an aspect of the present invention, an array of polymers on a surface of a substrate is presented, where the surface of the substrate is silanated by a silanation composition that includes a mixture of two or more silanation reagents, where at least one silanation reagent includes a functional group capable of supporting polymer synthesis and at least one silanation reagent includes no functional group capable of supporting polymer synthesis.

Preferably the polymer is a nucleic acid. The polymer is also preferably a polypeptide.

In a preferred embodiment of the array of polymers on a surface of a substrate, the silanation composition comprises bis(3-trimethoxysilylpropyl)methylamine and one of N-2-hydroxyethyl-N-methyl-3-aminopropyltrimethoxysilane and N-2-hydroxyethyl-N,N-bis(trimethoxysilylpropyl)amine.

In a preferred embodiment of the array of polymers on a surface of a substrate, the at least one silanation reagent which includes a functional group capable of supporting polymer synthesis is selected from the group consisting of:

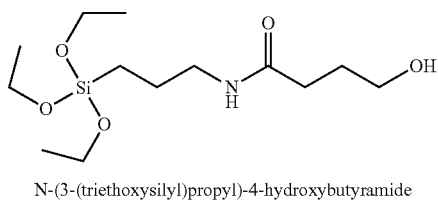

N-(3-(triethoxysilyl)propyl)-4-hydroxybutyramide

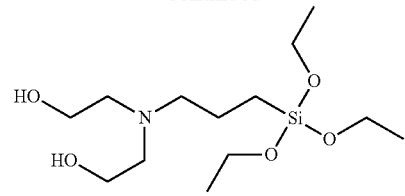

N,N-bis(2-hydroxyethyl)-3-aminopropyltriethoxysilane

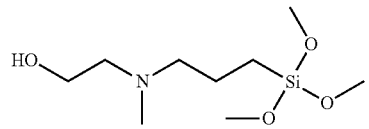

3-((2-hydroxyethyl)methylamino)propyltrimethoxysilane

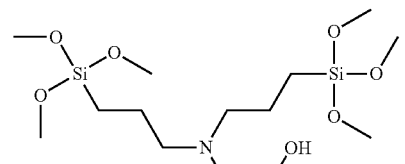

N-(2-hydroxyethyl)-N,N-bis(trimethoxysilylpropyl)amine

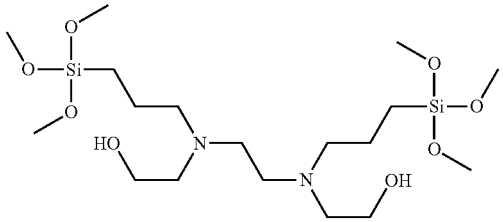

1,2-bis((2-hydroxyethyl)(3-trimethoxysilylpropyl)aminoethane

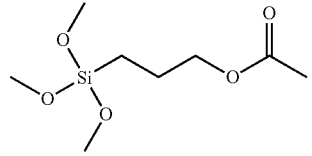

3-acetoxypropyltrimethoxysilane

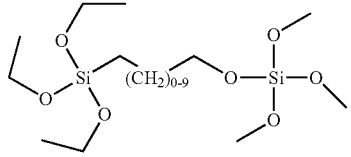

(trimethoxysilyloxy)-(C$_3$—C$_{12}$-alkyl)-triethoxysilane

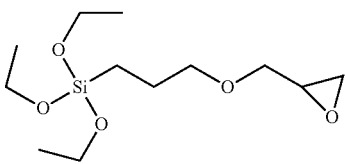

3-glycidoxypropyltriethoxysilane and wherein the at least one silane reagent which does not include a functional group capable of supporting polymer synthesis is selected from the group consisting of alkyltrimethoxysilane, 1,2-bis(trimethoxysilyl)ethane, 1,3-bis(trimethoxysilyl)propane, 1,6-bis(trimethoxysilyl)hexane, 3-(N,N-dimethylamino)propyltrimethoxysilane and N,N-bis(3-trimethoxysilylpropyl)methylamine.

In a preferred embodiment of the array of polymers on a surface of a substrate, the at least one silanation reagent which includes a functional group capable of supporting polymer synthesis comprises a masked silanation reagent.

Preferred masked silanation reagents include:

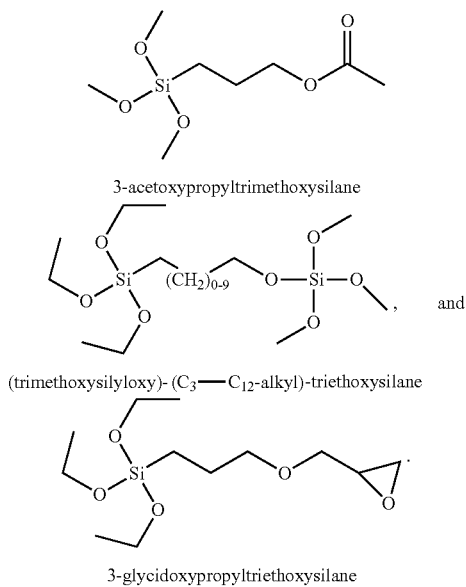

3-acetoxypropyltrimethoxysilane (trimethoxysilyloxy)-(C$_3$—C$_{12}$-alkyl)-triethoxysilane 3-glycidoxypropyltriethoxysilane Preferably, the masked silanation reagent is deprotected to provide a deprotected functional group capable of supporting polymer synthesis.

In a preferred embodiment of the array of polymers on the surface of a substrate, the at least one silanation reagent which includes a functional group capable of supporting polymer synthesis is N,N-bis(2-hydroxyethyl)-3-aminopropyltriethoxysilane and the at least one silanation reagent which includes no functional group capable of supporting polymer synthesis is 1,2-bis(trimethoxysilyl)ethane.

In a preferred embodiment of the array of polymers on the surface of a substrate, the at least one silanation reagent which includes a functional group capable of supporting polymer synthesis is N-(2-hydroxyethyl)-N,N-bis(trimethoxysilylpropyl)amine and the at least one silanation reagent which includes no functional group capable of supporting polymer synthesis is 1,2-bis(trimethoxysilyl)ethane.

In a preferred embodiment of the array of polymers on the surface of a substrate, the at least one silanation reagent which includes no functional group capable of ratios.

Preferably, the predetermined ratios are molar ratios. In a preferred embodiment of the array of polymers on the surface of a substrate, the molar ratio of the at least one silanation reagent which includes no functional group capable of supporting polymer synthesis and the at least one silanation reagent which includes a functional group capable of supporting polymer synthesis are present at ranges from about 5 to 1 to 500 to 1, respectively. More preferably, the W/V ratio ranges from about 5 to 1 to 200 to 1, respectively. Still more preferably, the ratio ranges from about 50 to 1 to 100 to 1, respectively. Most preferably, the ratio is about 100 to 1 and 99 to 1, respectively.

In a preferred embodiment of the array of polymers on the surface if a substrate, the at least one silanation reagent which includes no functional group capable of supporting polymer synthesis is 1,2-bis(trimethoxysilyl)ethane and the at least one silanation reagent which includes a functional group capable of supporting polymer synthesis is bis(2-hydroxyethyl)-3-aminopropyltriethoxysilane.

In, a preferred embodiment of the array of polymers on the surface of a substrate, the W/V ratio of 1,2-bis(trimethoxysilyl)ethane to bis(2-hydroxyethyl)-3-aminopropyltriethoxysilane ranges from about 5 to 1 to 500 to 1, respectively. Still more preferably, the W/V ratio of 1,2-bis(trimethoxysilyl)ethane to bis(2-hydroxyethyl)-3-aminopropyltriethoxysilane ranges from about 5 to 1 to 200 to 1, respectively. More preferably, the W/V ratio of 1,2-bis(trimethoxysilyl)ethane to bis(2-hydroxyethyl)-3-aminopropyltriethoxysilane ranges from about 50 to 1 to 100 to 1, respectively. Most preferably, the W/V ratio of 1,2-bis(trimethoxysilyl)ethane to bis(2-hydroxyethyl)-3-aminopropyltriethoxysilane ratio is about 100 to 1, respectively.

In another preferred embodiment of the array of polymers, the silanating composition does not comprise a mixture of bis(2-hydroxyethyl)-3-aminopropyltriethoxysilane and 1,2-bis(trimethoxysilyl)ethane. In another preferred embodiment, the composition does not contain 1,2-bis(trimethoxysilyl)ethane.

According to an aspect of the present invention, a method is presented of silanating a substrate with mixture of two or more silanation reagents, where at least one silanation reagent which includes no functional group capable of supporting polymer synthesis and at least one silanation reagent includes a functional group capable of supporting polymer synthesis, the substrate comprising a silica or other silicon oxide-containing surface, the steps of the method include a. providing as substrate;

b. immersing the substrate into anhydrous ethanol for a set period of time;

c. transferring the substrate into a container of silane mixture, the silane mixture comprising at least one silanation reagent which includes no functional group capable of supporting polymer synthesis and at least one silanation reagent includes a functional group capable of supporting polymer synthesis for a set time; and d. rinsing the substrate with 2-propanol.

Preferably, the silane mixture is 1:99 mole % Bisb silane and BTSME silane. In a preferred embodiment the the silane mixture of Bisb silane and BTSME silane and further contains anhydrous alcohol, deionized water, and the set time is about 60 minutes.

EXAMPLES

I. Substrate Silanation Using a 1:99 Molar Bisb:BTMSE Mixture

The following procedure was used to silanate wafers for R&D and experimental purposes.

Definitions:
Bisb: N-(2-hydroxyethyl)-N,N-bis(trimethoxysilylpropyl)amine in 65% methanol.
BTMSE: Bis(trimethoxysilyl)ethane
SRD: Spin Rinse Dryer
DI H$_2$O: Deionized Water
RPM: Revolutions per Minute
Substrates: Wafers or slides Procedure:

Four 8×8" tanks that have been cleaned and dried were provided. The tanks were designated as follows: Tank #1 Reagent Alcohol, Tank #2 Silane Bath, Tank #3 2-Propanol Bath Rinse #1 and Tank #4 2-Propanol Bath Rinse #2.

Tank #1 was prepared by adding 6.0 L of Reagent Alcohol to the tank.

Tank #2 (1:99 mol % Bisb:BTMSE Silane Solution) was prepared as follows: 5610 mL of reagent alcohol was mixed with 310 mL of DI $H_2O$ and stirred for 3 minutes. After stirring, 40 mL of BTMSE crosslinker into a 100 mL graduated cylinder and slowly added to Tank #2. 40 mL of reagent alcohol was slowly poured into Tank #2 and stirred for 3 minutes. Finally, 780 µL of Bisb Silane was slowly added to Tank #2 and followed by stirring the mixture for a minimum of 4 hours-maximum 12 hours before Silanation.

Tanks #3 and 4 were both employed to rinse the substrate with 2-propanol, each consisted of 6 L of the alcohol.

Silanation was conducted by first transferring the substrates to be silanated into weighted substrate cassettes. The cassettes were immersed several times into Tank #1, "Reagent Alcohol" for a total of about 3 minutes.

After the 3-minute soak in Tank #1, the cassettes were immediately transferred to Tank #2, "Silane", so that the entire substrate was submerged. An orbital shaker was employed and the cassettes were left exposed to Tank #2 for about 60 minutes.

Immediately after expiration of the 60 minutes, the cassettes were transferred to Tank #3, "2-Propanol" rinse #1 for 5 minutes. The cassettes were then transferred to Tank #4, "2-Propanol" rinse for 5 minutes.

II. Functional and Non-Functional Silanes

Various functional and non-functional silanes were prepared at different molar ratios to test which mixtures provided an appropriate hydroxyl density ($pmol/cm^2$). Two functional and two non functional silanes are depicted in FIG. 1.

III. Formulations for Silanation: R2+Bisb

To test which molar ratios of non-functional silanes to functional silanes provided the desired hydroxyl density various molar ratios of silanation solution were prepared. These are depicted in FIG. 2.

IV. Functional Hydroxyl Density Determination R2/Bisb

Functional hydroxyl density on the substrate was determined using the silane mixtures of Example 2. The results are depicted in FIG. 3.

V. Molar Ratio of Functional and Non-Functional Silanes

To determine appropriate molar ratios of two other functional and non-functional silanes, three different silanation solutions with three different molar ratios of R2/R1 (98, 50, and 10) were prepared. The compositions are depicted in FIG. 4.

VI. Functional Hydroxyl Density Determination: R2/R1

The hydroxyl density in $pmol/cm^2$ on the substrate provided by the R2/R1 solutions was determined and the data presented in FIG. 5.

VII. Fabrication of High Density Arrays with Functional and Non-Functional Silanes To determine whether silanation with non-functional and functional silanes using a high proportion of nonfunctional to functional silanes provided improved hybridization results high density arrays were constructed. One high density array having 3 micron features and 25 mer probes was fabricated using two silane solutions, including Bisb (a functional silane) at approximately 60 $pmol/cm^2$ on the substrate.

A second array was constructed using a 1:99 Bisb:BTMSE (a non-functional silane), which provided a functional hydroxyl density of approximately 20 pmol/cm2. The second array also had 3 micron features and 25 mer probes.

Both arrays were hybridized to 20 mM DNA target/SAPE for 16 hours. The Bisb array after 16 hours of hybridization gave no signal and a background intensity of 85. In contrast, the Bisb:BTMSE (1:99 ratio) gave high signal hybridization results (0, 60,000) display range and good signal (intensity approximately 60,000).

To determine if the Bisb array could yield better signal with longer hybridization, a Bisb array, identical to that described above was hybridized to 20 mM DNA/SAPE for 112 hours. Signal did improve after the 112 hour hybridization, but to only 0, 20,000 display range, one third of the Bisb:BTMSE array hybridized for only 16 hours. Intensity improved as well, but only to 16,000 as opposed to 40,000 for the Bisb:BTMSE.

The Bisb:BTMSE (1:99 ratio) silane composition thus provided dramatically increased signal as compared to the Bisb array. While hybridization results could be improved for the Bisb array by hybridizing for 112 hours, the display range and signal intensity were still substantially below the Bisb:BTMSE array after only 16 hours hybridization. In addition, a 112 hour hybridization is impractical for regular experimentation with high density arrays.

Figure 6:
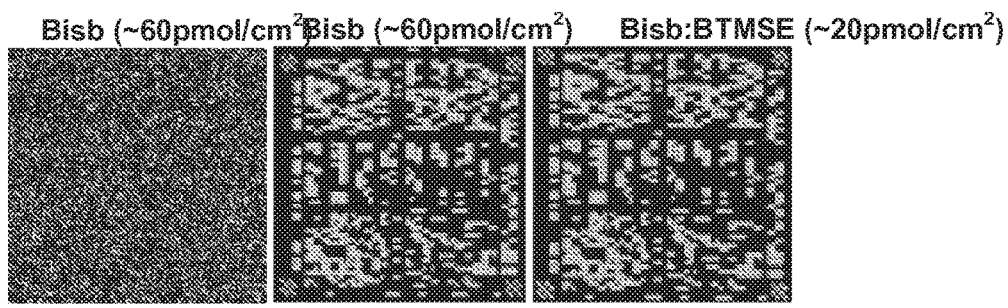
FIG. 6 depicts high efficiency PAG/DMT synthesis of 3 μm array in a 25 mer test pattern and the corresponding hybridization signals.

The results of these experiments are depicted in FIG. 6.

All publications, patents and patent applications referred to herein are incorporation herein by reference in their entirety.

The above description is illustrative and not restrictive. Many variations of the invention will become apparent to those of skill in the art upon review of this disclosure. Merely by way of example a variety of substrates, polymers, initiators, synthesis initiation sites, and other materials may be used without departing from the scope of the invention.

The invention claimed is:

1. A method of preparing an array of monomers or polymers comprising:
    providing a substrate including a silica surface or other silicon oxide-containing surface thereon;
    contacting the silica or the other silicon oxide-containing surface of the substrate with a silanation composition comprising a mixture of a first compound and a second compound such that the first and the second compounds are covalently attached to the surface to form a silanation coating;
    the first compound comprising a trialkoxy silyl group and a functional group, wherein said functional group is capable of supporting polymer synthesis and is selected from the group consisting of hydroxyl, amino and carboxyl; the first compound being selected from the group consisting of N-(3-(triethoxysilyl)-propyl)-4-hydroxybutyramide; N,N-bis(2-hydroxyethyl)-3-aminopropyltriethoxysilane; 3-((2 hydroxyethyl)methylamino)propyl-trimethoxysilane; N-(2-hydroxy-ethyl)-N,N-bis(trimethoxy-silylpropyl)-amine; 1,2-bis((2-hydroxyethyl)-(3 trimethoxysilylpropyl)aminoethane; 3-acetoxy-propyltrimethoxysilane; (trimethoxysilyloxy)-(C3-C12-alkyl)-(triethoxysilane); and 3-glycidoxypropyltriethoxysilane; and the second compound comprising a trialkoxy silyl group and wherein the second compound in the mixture does not include the functional group of the first compound; the second compound being selected from the group consisting of 1,2-bis(trimethoxysilyl)-ethane; 1,3-bis (trimethoxysilyl)propane; 1,6-bis(trimethoxysilyl) hexane; 3-(N,N-dimethyl-amino)-propyl-trimethoxysilane; and N,N-bis(3-trimethoxysilylpropyl)-methylamine;

wherein the molar ratio of the first compound to the second compound in the mixture ranges from about 1:50 to 1:500;

and wherein the mixture of the first and second compounds in the silanation coating imparts increased hydrolytic stability to the coating;

protecting the functional group capable of supporting polymer synthesis of the first compound with a protecting group or reacting the functional group capable of supporting polymer synthesis of the first compound with a compound having a reactive group protected by a protecting group to provide the first compound of the silanation coating protected with the protecting group;

removing the protecting group of the first compound in selected regions of the silanation coating to provide an exposed functional or reactive group;

reacting said exposed functional or reactive group with the monomer or the polymer whereby the monomer or the polymer is coupled to the exposed group; and repeating the steps of removing and reacting to produce the array of monomers or polymers.

2. A method of preparing an array of polymers according to claim 1, wherein the protecting group is a photoremovable protecting group.

3. A method of preparing an array of polymers according to claim 1, wherein the step of removing comprises activating a photoacid generator in the selected regions by selective application of light having a predetermined wavelength to provide an acid and exposing the protecting group to the acid.

4. A method of preparing an array of polymers according to claim 1 wherein the first compound is N-(2-hydroxyethyl)-N,N-bis(trimethoxysilylpropyl)amine and the second compound is 1,2-bis(trimethoxysilyl)ethane.

5. The method of claim 1, wherein the first compound is N-(3-(triethoxysilyl)propyl)-4-hydroxybutyramide.

6. The method of claim 1, wherein the first compound is N,N-bis(2-hydroxyethyl)-3aminopropyltriethoxysilane.

7. The method of claim 1, wherein the first compound is 3-((2-hydroxyethyl)methylamino)propyltrimethoxysilane.

8. The method of claim 1, wherein the first compound is N-(2-hydroxyethyl)-N,N-bis(trimethoxysilylpropyl)amine.

9. The method of claim 1, wherein the first compound is 1,2-bis((2-hydroxyethyl)(3-trimethoxysilylpropyl)aminoethane.

10. The method of claim 1, wherein the first compound is 3-acetoxypropyltrimethoxysilane.

11. The method of claim 1, wherein the first compound is (trimethoxysilyloxy)-(C3-C12-alkyl)-(triethoxysilane).

12. The method of claim 1, wherein the first compound is 3-glycidoxypropyltriethoxysilane.

13. The method of claim 1, wherein the second compound is 1,2-bis(trimethoxysilyl)ethane.

14. The method of claim 1, wherein the second compound is bis(trimethoxysilyl)propane.

15. The method of claim 1, wherein the second compound is 1,6-bis(trimethoxysilyl) hexane.

16. The method of claim 1, wherein the second compound is 3-(N,N-dimethylamino)propyltrimethoxysilane.

17. The method of claim 1, wherein the second compound is N,N-bis(3-trimethoxysilylpropyl)-methylamine.

18. The method of claim 1, wherein the polymers are nucleic acids.

19. The method of claim 1, wherein the functional group of the first compound capable of supporting polymer synthesis is protected with a protecting group before the polymers of the array are attached to the silanated substrate.

20. The method of claim 1, wherein the protecting group is an acid labile protecting group.

21. The method of claim 1, wherein the protecting group is removed by activation of a photoacid generator in selected regions of the silica surface by selective application of light having a predetermined wavelength to provide an acid and exposure of the protecting group to the acid.

22. The method of claim 1, wherein the first compound is N-(2-hydroxyethyl)-N,N-bis(trimethoxysilylpropyl)amine and the second compound is 1,2-bis(trimethoxysilyl)ethane.

23. The method of claim 1, wherein the molar ratio of the second compound to the first compound in the mixture ranges from about 50:1 to 100:1.

24. The method of claim 1, wherein the molar ratio of the second compound to the first compound in the mixture is about 99:1.

25. The method of claim 1, wherein the second compound is 1,2-bis(trimethoxysilyl)ethane and the first compound is bis(2-hydroxyethyl)-3-aminopropyltriethoxysilane.

26. The method of claim 1, wherein the molar ratio of 1,2-bis(trimethoxysilyl)ethane to bis(2-hydroxyethyl)-3-aminopropyltriethoxysilane in the mixture ranges from about 50:1 to 100:1.

27. The method of claim 1, wherein the molar ratio of 1,2-bis(trimethoxysilyl)ethane to bis(2-hydroxyethyl)-3-aminopropyltriethoxysilane in the mixture is about 99:1.

28. The method of claim 1, wherein the silanation coating does not comprise a mixture of bis(2-hydroxyethyl)-3-aminopropyltriethoxysilane and 1,2-bis(trimethoxy silyl)ethane.

29. The method of claim 1, wherein the silanation coating does not contain 1,2-bis(trimethoxysilyl)ethane.

30. The method of claim 1, further comprising a hexaethylene glycol linker extending from the functional group capable of supporting polymer synthesis to the polymers of the array.

* * * * *